US008022750B2

(12) United States Patent
Nakamura

(10) Patent No.: US 8,022,750 B2
(45) Date of Patent: Sep. 20, 2011

(54) BOOST CIRCUIT

(75) Inventor: Hiroshi Nakamura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/700,192

(22) Filed: Feb. 4, 2010

(65) Prior Publication Data

US 2010/0134178 A1    Jun. 3, 2010

Related U.S. Application Data

(62) Division of application No. 11/131,258, filed on May 18, 2005, now Pat. No. 7,679,429.

(30) Foreign Application Priority Data

May 26, 2004  (JP) ................................ 2004-156487

(51) Int. Cl.
*G05F 1/10*    (2006.01)
(52) U.S. Cl. ...................................................... 327/536
(58) Field of Classification Search ........................ None
See application file for complete search history.

(56) References Cited

U.S. PATENT DOCUMENTS

| 4,935,644 | A |   | 6/1990  | Tsujimoto |         |
|-----------|---|---|---------|-----------|---------|
| 5,734,290 | A | * | 3/1998  | Chang et al. | 327/536 |
| 5,892,267 | A |   | 4/1999  | Takada    |         |
| 6,373,327 | B1|   | 4/2002  | Nakamura  |         |
| 6,404,271 | B2|   | 6/2002  | Ayres     |         |
| 6,525,595 | B2|   | 2/2003  | Oku       |         |
| 2003/0184360 | A1| * | 10/2003 | Wang et al. | 327/536 |

FOREIGN PATENT DOCUMENTS

JP    2001-84783    3/2001

OTHER PUBLICATIONS

Jieh-Tsorng Wu, et al., "MOS Charge Pumps for Low-Voltage Operation", IEEE Journal of Solid-State Circuits, vol. 33, No. 4, Apr. 1998, pp. 592-597.

* cited by examiner

*Primary Examiner* — Lincoln Donovan
*Assistant Examiner* — Khareem E Almo
(74) *Attorney, Agent, or Firm* — Oblon, Spivak, McClelland, Maier & Neustadt, L.L.P.

(57) ABSTRACT

A boost circuit includes: first transistors connected in series between a voltage input node and a voltage output node to constitute a charge transfer circuit; and first capacitors, one ends of which are coupled to the respective connection nodes between the first transistors, the other ends thereof being applied with clocks with plural phases, wherein a gate of a certain stage transistor corresponding to one of the first transistors in the charge transfer circuit is coupled to a drain of another stage transistor corresponding to another one of the first transistors, which is disposed nearer to the voltage output node than the certain stage transistor and driven by the same phase clock as that of the certain stage transistor, the certain stage transistor being disposed nearer to the voltage output node than an initial stage transistor.

6 Claims, 35 Drawing Sheets

BOOST CIRCUIT

CROSS-REFERENCE TO RELATED APPLICATION

This application is a divisional of U.S. application Ser. No. 11/131,258 filed May 18, 2005, and is based on and claims the benefit of priority from the prior Japanese Patent Application No. 2004-156487, filed on May 26, 2004, the entire contents of each of which are incorporated herein by reference.

BACKGROUND OF THE INVENTION

1. Field of the Invention

This invention relates to a boost circuit used in a semiconductor integrated circuit device such as a flash memory.

2. Description of Related Art

As electrically rewritable and non-volatile memories (i.e., EEPROMs), various kinds of types of flash memories are known such as NAND-type, NOR-type, DINOR-type and so on. Since it is required of these flash memories to generate various voltages higher than the power supply voltage in accordance with operation modes, boost circuits are usually integrally formed in the memory chip.

A boost circuit is usually formed of a charge pumping circuit, which is formed of transistors serving as charge transfer devices and capacitors serving as pumping devices. For example, as shown in FIG. 36, plural diode-connected NMOS transistors are connected in series between a power supply node and an output node, on which a boosted voltage is generated. Coupled to the respective connection nodes of the NMOS transistors are one ends of capacitors, which serving for controlling potentials of the connection nodes, respectively, by capacitive coupling. The other ends of the capacitors are applied with complementary clocks in such a way that even-numbered capacitors and odd-numbered ones are driven in the reverse phase. As a result, a boosted voltage higher than the power supply voltage is output on the output node (see, for example, FIG. 4 in Unexamined Japanese Patent Application Publication No. 2001-84783).

In the conventionally used, two-phase driving boost circuit, charge transfer between adjacent two capacitors is limited by threshold voltage Vth of the NMOS transistor. That is, with coupling gate to drain, the NMOS transistor serves as a diode for transferring charge in one direction. In this case, supposing that the drain and gate voltage is Vd, a voltage transferred to the source is limited to Vd-Vth.

Therefore, in case it is impossible to reduce the threshold voltage of the NMOS transistor in the boost circuit to a sufficiently low level due to restrictions on fabrication processes, ability thereof to transfer charge is limited so that it becomes difficult to generate a high voltage at a high rate. In addition, even if the threshold voltage is made low by a certain level, as the output voltage at the boost output node becomes higher, the threshold voltage of the NMOS transistor becomes higher due to a so-called substrate bias effect. Therefore, the charge transferring efficiency of each stage NMOS transistor is reduced, thereby reducing the boost rate.

To solve this problem, it is effective to make the capacitors large in capacitance. However, this leads to increase of the occupied area of the boost circuit.

SUMMARY OF THE INVENTION

According to an aspect of the present invention, there is provided a boost circuit including: first transistors connected in series between a voltage input node and a voltage output node to constitute a charge transfer circuit; and first capacitors, one ends of which are coupled to the respective connection nodes between the first transistors, the other ends thereof being applied with clocks with plural phases, wherein a gate of a certain stage transistor corresponding to one of the first transistors in the charge transfer circuit is coupled to a drain of another stage transistor corresponding to another one of the first transistors, which is disposed nearer to the voltage output node than the certain stage transistor and driven by the same phase clock as that of the certain stage transistor, the certain stage transistor being disposed nearer to the voltage output node than an initial stage transistor.

According to another aspect of the present invention, there is provided a boost circuit including: a first charge transfer circuit with first transistors connected in series between a voltage input node and a voltage output node; a second charge transfer circuit with second transistors connected in series between the voltage input node and the voltage output node; first capacitors, one ends of which are coupled to first connection nodes between the first transistors, respectively, the other ends thereof being applied with clocks with plural phases; and second capacitors, one ends of which are coupled to second connection nodes between the second transistors, respectively, the other ends thereof being applied with the clocks with plural phases, wherein the corresponding first and second connection nodes in the first and second charge transfer circuits are driven with substantially reverse phases via the first and second capacitors, respectively, while the corresponding gates of the first and second transistors are driven with substantially reverse phases via the second and first capacitors, respectively.

DETAILED DESCRIPTION OF THE EMBODIMENTS

Illustrative embodiments of this invention will be explained with reference to the accompanying drawings below.

Figure 1:
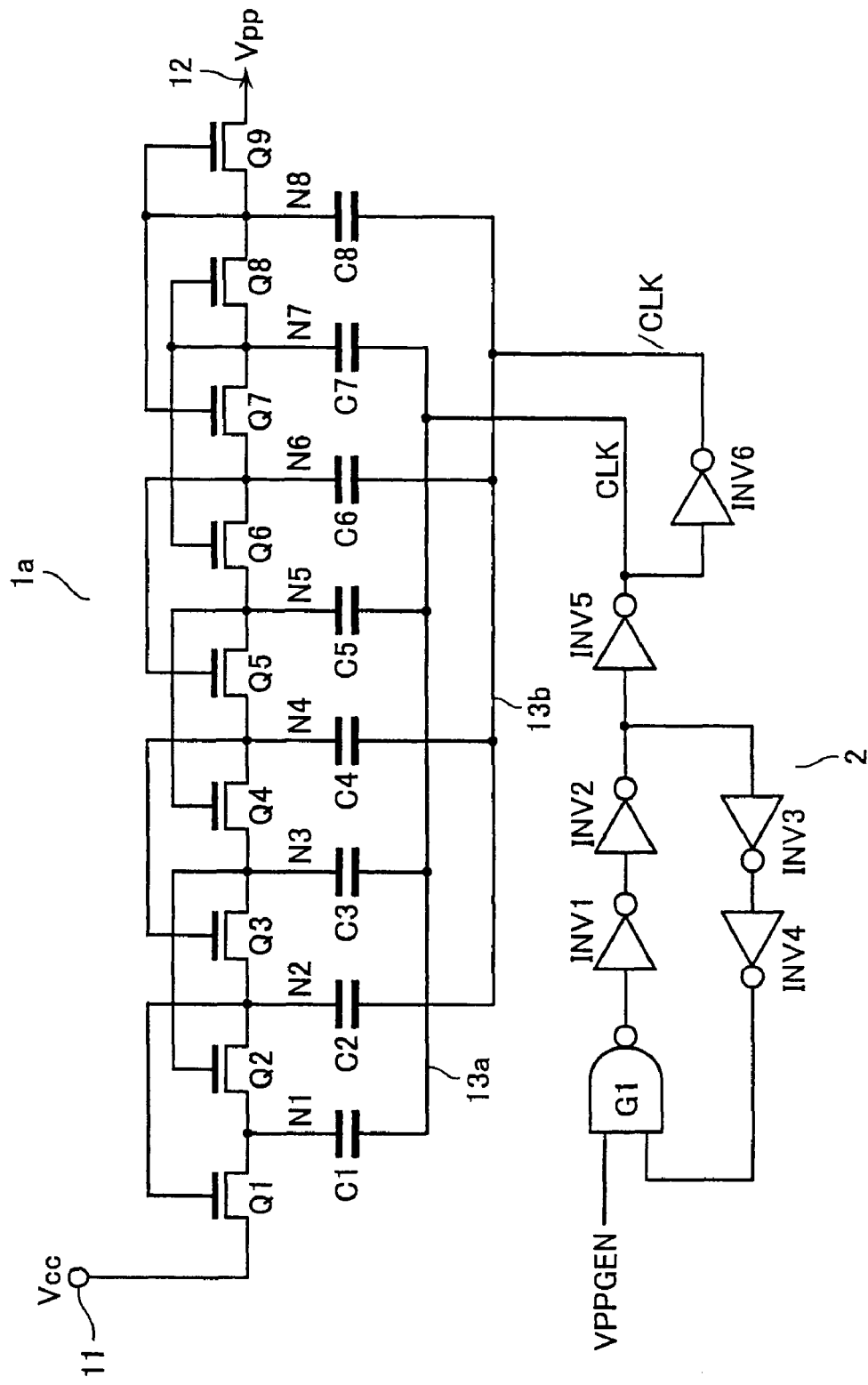
FIG. 1 shows a boost circuit in accordance with an embodiment of the present invention.

FIG. 1 shows a boost circuit (i.e., charge pumping circuit) 1a and a clock generator circuit 2 for driving it in accordance with an embodiment. The boost circuit 1a has plural NMOS transistors Q1, Q2, . . . , Q9 connected in series between a voltage input node 11, to which power supply voltage Vcc is applied in this embodiment, and a voltage output node 12, on which a boosted voltage is generated. Hereinafter, these nodes 11 and 12 will be referred to as "Vcc node" and "Vpp node", respectively.

Coupled to connection nodes N1, N2, . . . , N8 between these NMOS transistors are one ends of capacitors C1, C2, . . . , S8, respectively. The other ends of these capacitors are coupled to a first clock node 13a, to which a first clock (CLK) is supplied, and a second clock node 13b, to which a second clock (/CLK) with a reverse phase is supplied, in such a manner that even numbered ones are coupled to the first clock node 13a; and odd numbered ones to the second clock node 13b.

NMOS transistors Q1, Q2, . . . , Q9 are driven by the complementary clocks CLK and /CLK in such a way that even numbered ones and odd numbered ones are alternately turned on, thereby performing a voltage-boost operation with transferring positive charge from the Vcc node 11 to Vpp node 12. For this purpose, gate and drain of each NMOS transistors Q1, Q2, . . . , Q9 are interconnected in the conventional boost circuit. Therefore, each transistor serves as a diode for transferring charge in one direction.

By contrast to this, in this embodiment, gate of the first transistor Q1 is coupled to connection node N2, to which source of the second transistor Q2 and drain of the third transistor Q3 are connected. Gate of the second transistor Q2 is coupled to connection node N3, to which source of the third transistor Q3 and drain of the fourth transistor Q4 are connected.

As similar to the above-description, gates of the 3rd, 4th, 5th, 6th and 7th transistors Q3, Q4, Q5, Q6 and Q7 are coupled to drains of 5th, 6th, 7th, 8th and 9th transistors Q5, Q6, Q7, Q8 and Q9 (i.e., connection nodes N4, N5, N6, N7 and N8), respectively.

In other words, in this embodiment, gate of a certain stage transistor in the charge transfer circuit is coupled to drain of another stage transistor, which is disposed nearer to the Vpp node 12 than the certain stage transistor and driven by the same phase as the certain stage transistor. Note here that since transistors Q8 and Q9 nearest to the Vpp node 12 have no nodes, to which gates thereof are to be coupled, gates and drains are interconnected (i.e., diode-connected) in these transistors.

In general, the above-described interconnection relationship in the boost circuit will be explained as follows: supposing that the charge transfer circuit has N (N is an integer equal to 3 or more) transistors, gate of i-th transistor Qi (where "i" is a stage number counted from Vcc node 11, which is an integer equal to 1 or more and smaller than N−2) is coupled to the connection node Ni+1 between (i+1)-th transistor Qi+1 and (i+2)-th transistor Qi+2.

The clock generating circuit 2 is formed of a ring oscillator, in which two-input type of NAND gate G1 and inverters INV1-INV4 are ring-connected. NAND gate G1 serves as an inverter when an activation signal VPPGEN (="H") is applied to one input thereof. Based on the oscillator output, first clock CLK is generated via an inverter INV5; and second clock /CLK is generated via another inverter INV6. These clocks CLK and /CLK are supplied to the clock supply nodes 13a and 13b, respectively.

Operations of the boost circuit in accordance with this embodiment will be explained below. While the activation signal VPPGEN is "L", the clock generation circuit 2 is inactive, and the boost circuit 1 also is inactive. When the activation signal VPPGEN becomes "H", complementary clocks CLK, /CLK are generated, thereby starting the boost circuit 1a.

When CLK="L"; and /CLK="H", based on the capacitive coupling via capacitors C1-C8, odd-numbered connection nodes N1, N3, N5 and N7 are stepped down in voltage while even-numbered connection nodes N2, N4, N6 and N8 are stepped up in voltage. As a result, odd-numbered transistors Q1, Q3, Q5 and Q7 are turned on while even-numbered transistors Q2, Q4, Q6 and Q8 are turned off. Therefore, the charge at Vcc node 11 is transferred to the capacitor C1 via transistor Q1. Like this, charges in the capacitors C2, C4 and C6 are transferred to capacitors C3, C5 and C7 via transistors Q3, Q5 and Q7, respectively. At this time, since the final stage NMOS transistor Q9 is on by capacitive coupling of capacitor C8, charge of the capacitor C8 is transferred to Vpp node 12.

When CLK="H"; and /CLK="L", odd-numbered connection nodes N1, N3, N5 and N7 are stepped up while even-numbered connection nodes N2, N4, N6 and N8 are stepped down. As a result, odd-numbered transistors Q1, Q3, Q5 and Q7 are turned off while even-numbered transistors Q2, Q4, Q6 and Q8 are turned on. Therefore, charges in the capacitors C1, C3, C5 and C7 are transferred to capacitors C2, C4, C6 and C8 via transistors Q2, Q4, Q6 and Q8, respectively.

By repeat of the above-described charge-transferring operation, a boosted voltage Vpp higher than the power supply voltage Vcc is generated at the Vpp node 12. There is not shown in FIG. 1, but it is in general prepared a voltage limiting circuit at the Vpp node 12 for keeping the boosted output voltage constant.

The boost circuit in accordance with this embodiment has charge transferability higher than that in the conventional case. The reason will be explained in detail below. While the boost circuit 1a is operating, voltages VN1, VN3, VN5 and VN7 at the nodes N1, N3, N5 and N7, respectively, have a relationship of VN1<VN3<VN5<VN7, while voltages VN2, VN4, VN6 and VN8 at the nodes N2, N4, N6 and N8, respectively, satisfy the following expression: VN2<VN4<VN6<VN8. Note here that these relationships is exactly satisfied in such a state where capacitor driving is stopped after having elapsed at least four clock cycles, with which it starts to generate a boosted voltage, and when CLK="H", Vcc<VN1.

With giving attention to i-th transistor Qi (where "I" is a stage number counted from Vcc node 11, which is selected in 1 to 7), gate thereof is controlled by source (i.e., node Ni+1) of transistor Qi+1, which is disposed adjacent to transistor Qi on the side of Vpp node 11. Therefore, supposing that drain and gate voltages of transistor Qi are Vdi and Vgi, respectively, when it is turned on, the relationship of: Vdi=Vgi=VNi−1 is not satisfied as in the conventional case, but there is obtained such a relationship as: Vdi=VNi−1<Vgi=VNi+1. In this case, since the gate voltage of the transistor Qi is higher than that in the conventional case of Vdi=Vgi, the efficiency of charge transfer from the drain (node Ni−1) to the source (node Ni) of the transistor Qi becomes high. For example, Vgi−Vdi is larger than the threshold voltage of NMOS transistor Qi, voltage transfer (i.e., charge transfer) from drain to source (i.e., from node Ni−1 to node Ni) of the transistor Qi is not influenced by the threshold voltage thereof. That is, drain voltage may be transferred to source of transistor Qi without being reduced the level.

Therefore, even if it is impossible to reduce the threshold voltage in the boost circuit to a sufficiently low level due to restrictions on fabrication processes, the influence on the ability to transfer charge may be reduced in comparison with the conventional circuit. Further, in the NMOS transistor string, as a transistor is nearer to the Vpp node 12, substrate bias effect thereof becomes larger. As a result, with the above-described boost circuit in accordance with this embodiment, it is possible to generate a highly boosted voltage at a high rate.

Other boost circuits will be explained below. In the following embodiments, parts corresponding to those in FIG. 1 will be shown with the same reference signs as in FIG. 1, and detailed description thereof will be omitted.

Figure 2:
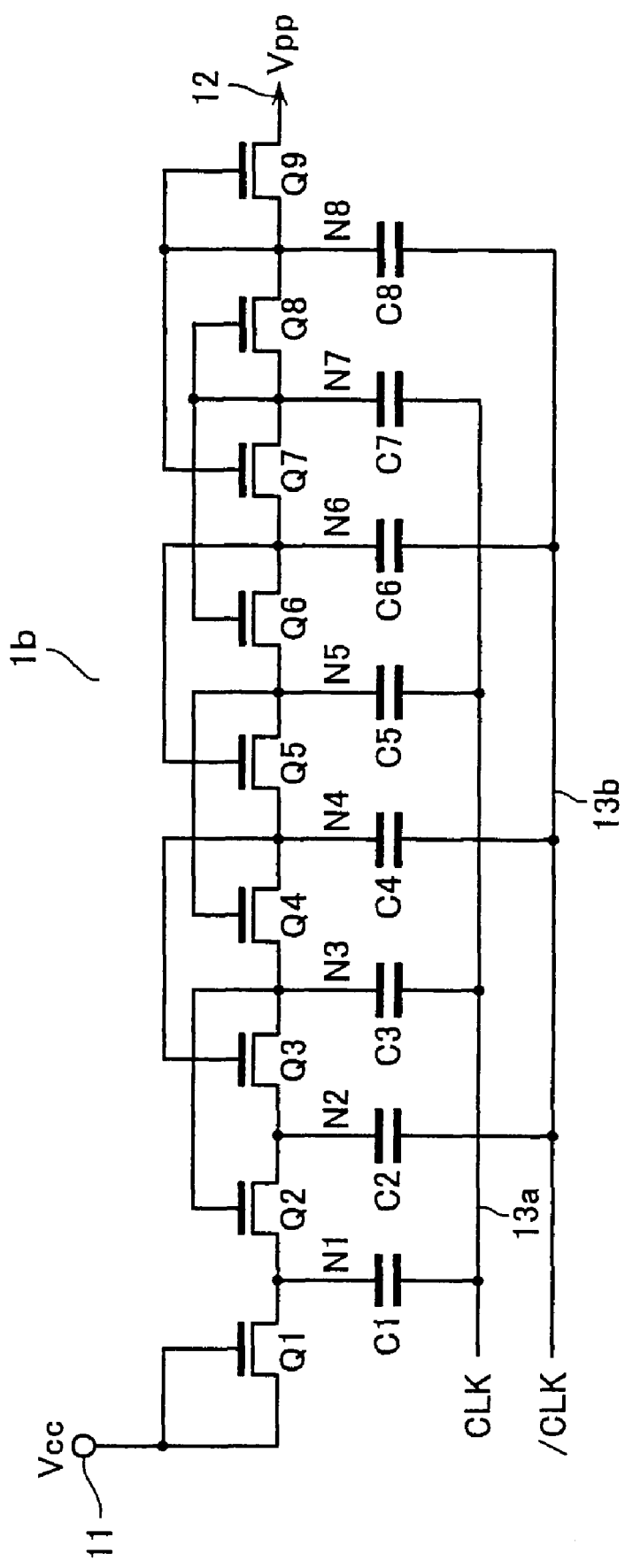
FIG. 2 shows a boost circuit in accordance with another embodiment.

In the boost circuit 1b shown in FIG. 2, gate of the initial stage NMOS transistor Q1 is coupled to drain thereof as similar to the conventional case. Although there is such a state in the boost operation of the boost circuit shown in FIG. 1, where the gate of the initial stage transistor Q1 becomes high than Vcc, the back bias effect of the transistor Q1 is smaller than those of transistors Q2-Q9. Therefore, in case that the threshold voltage of transistor Q1 is relatively low, there is a fear of charge-transferring from the node N1 to Vcc node 11 (i.e., charge flows reversely). With this reverse charge-flowing, the ability of the boost circuit will be reduced.

According to the boost circuit 1b shown in FIG. 2, even if the threshold voltage of transistor Q1 is relatively low, there is little fear of charge-flowing from the node N1 to Vcc node 11 due to that both gate and drain of the transistor Q1 are coupled to Vcc. Therefore, there may be provided a boost circuit, which is not strictly influenced by the threshold voltage of transistor Q1.

Figure 3:
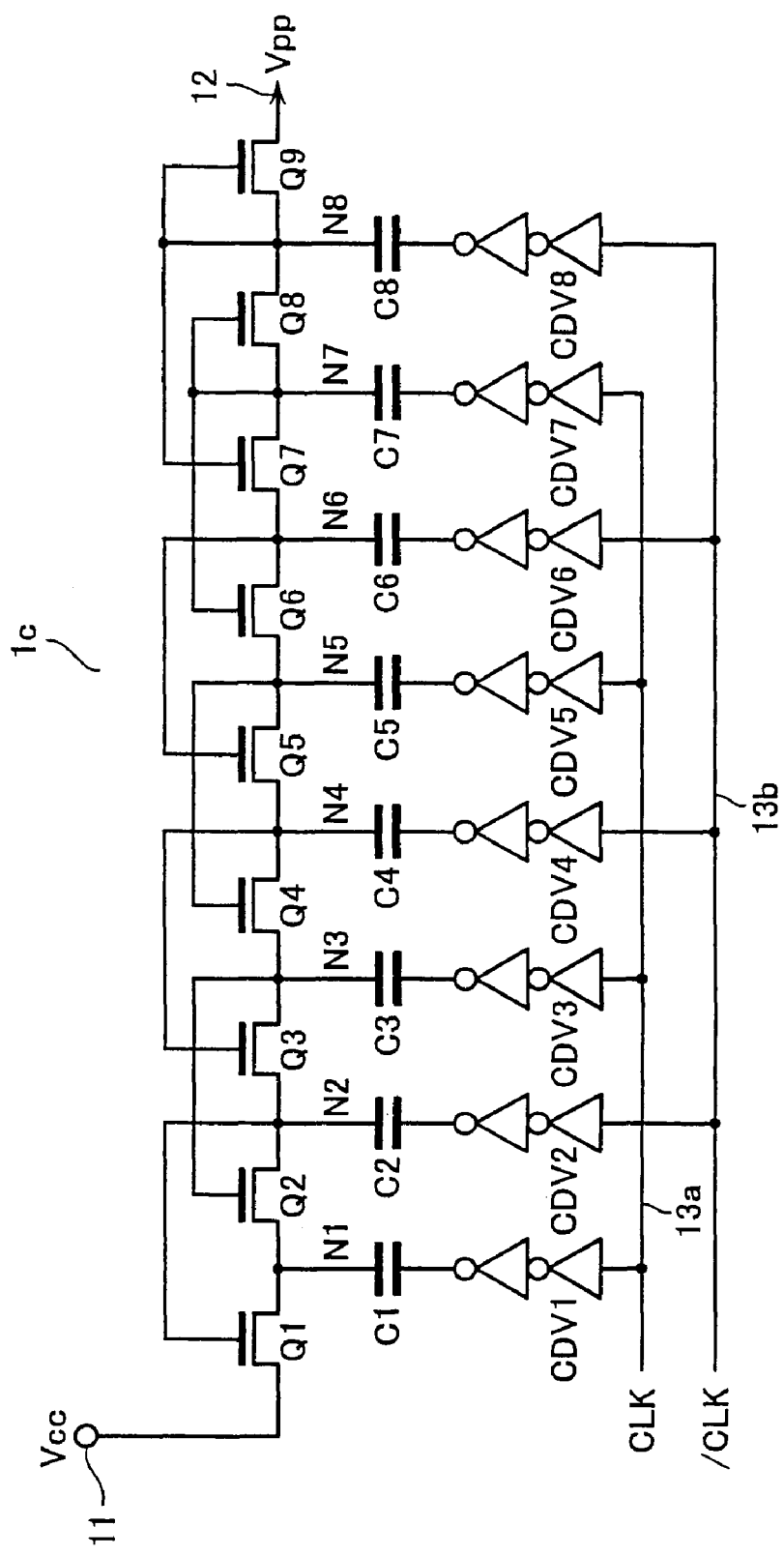
FIG. 3 shows a boost circuit in accordance with another embodiment.

In the boost circuit 1c shown in FIG. 3, in addition to the circuit shown in FIG. 1, there are prepared clock drivers each having two inverters connected in series, which are disposed between the capacitors C1-C8 and the clock supply nodes 13a and 13b, respectively.

Figure 4:
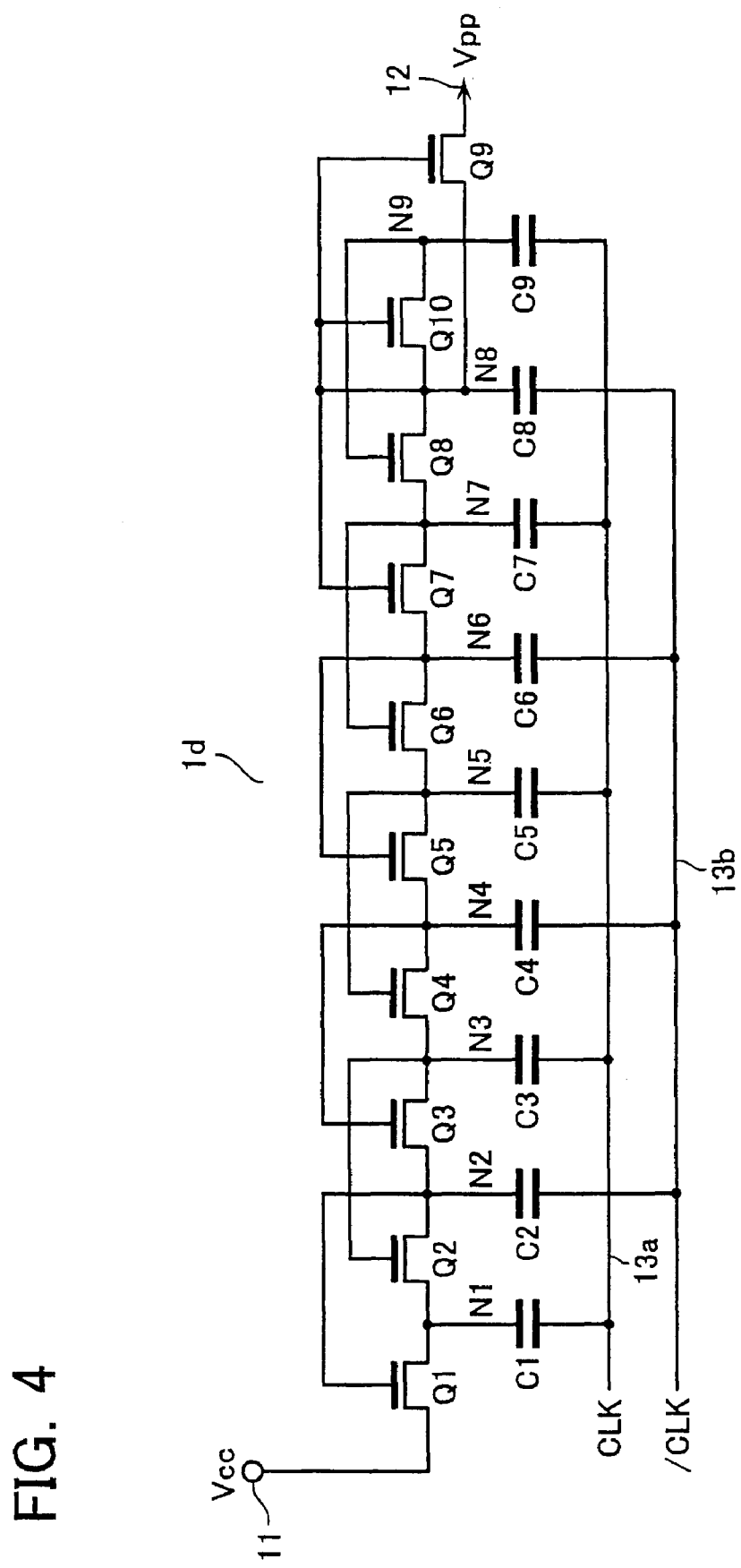
FIG. 4 shows a boost circuit in accordance with another embodiment.

Boost circuit 1d shown in FIG. 4 has an additional NMOS transistor Q10, gate and drain of which are coupled to the connection node N8 between the output stage NMOS transistor Q9 and the preceding stage NMOS transistor Q8 in the charge transfer circuit. Further, an additional capacitor C9 is disposed between the source node N9 of NMOS transistor Q10 and the clock supply node 13a. Additionally, gate of NMOS transistor Q8 is coupled to the connection node N9 between NMOS transistor Q10 and capacitor C9. As similar to the boost circuit 1a shown in FIG. 1, drain and gate of the output stage transistor Q9 are connected to the connection node N8.

In this boost circuit 1d, additional NMOS transistor Q10 and capacitor C9 constitute an additional charge transfer stage for increasing charge transferability of the charge transfer circuit. That is, NMOS transistor Q8 is driven by node N9, which is boosted to be higher than the node N7, whereby the charge transferability of NMOS transistor Q8 becomes higher than that in the boost circuit 1a shown in FIG. 1. Additionally, when the output stage transistor Q9 is turned on, gate and drain thereof are driven by the node N8, which is boosted to be higher than that in the boost circuit 1a shown in FIG. 1. As a result, charge quantity to be transferred to the Vpp node 12 via NMOS transistor Q9 becomes more than that in the boost circuit 1a shown in FIG. 1.

Figure 5:
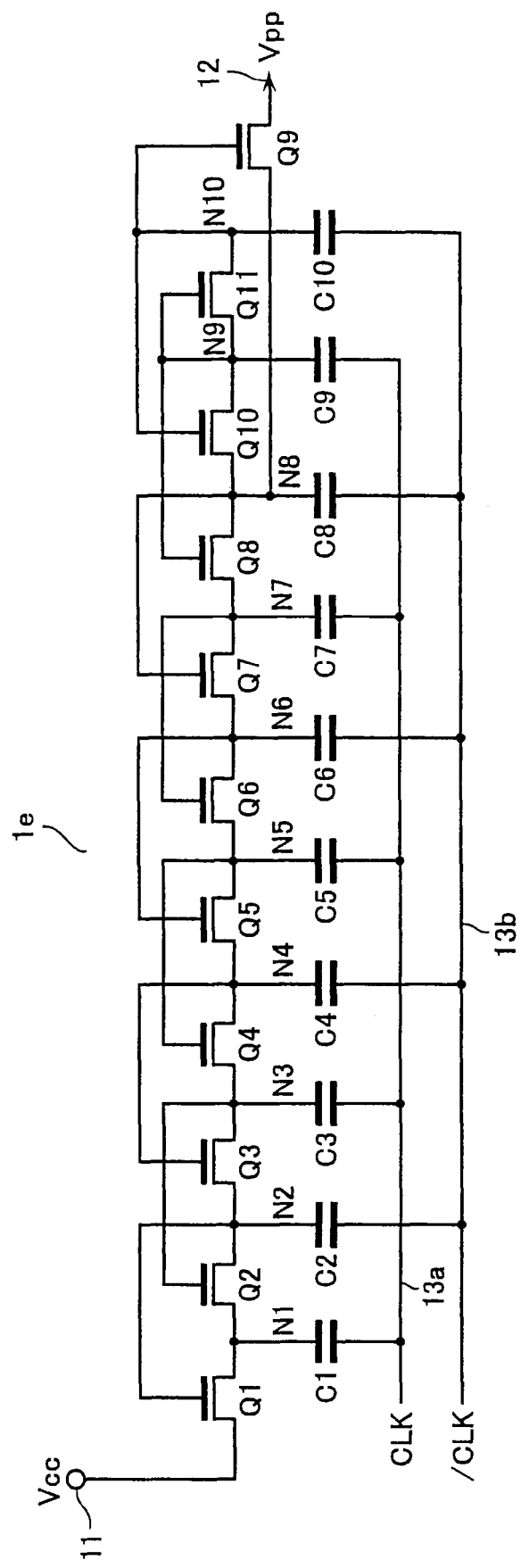
FIG. 5 shows a boost circuit in accordance with another embodiment.

Boost circuit 1e shown in FIG. 5 has, in addition to the boost circuit 1d shown in FIG. 4, additional NMOS transistor Q11, gate and drain of which are coupled to the source node N9 of NMOS transistor Q10. Further, an additional capacitor C10 is added to be connected to the source node N10 and driven by clock /CLK. Gate of NMOS transistor Q10 is coupled to the node N10 together with gate of the output stage transistor Q9.

In this boost circuit 1e, the charge transferability of NMOS transistors Q9 and Q10 is increased more in comparison with the boost circuit 1d shown in FIG. 4, whereby there is provided a boost circuit with a higher boost ability.

Figure 6:
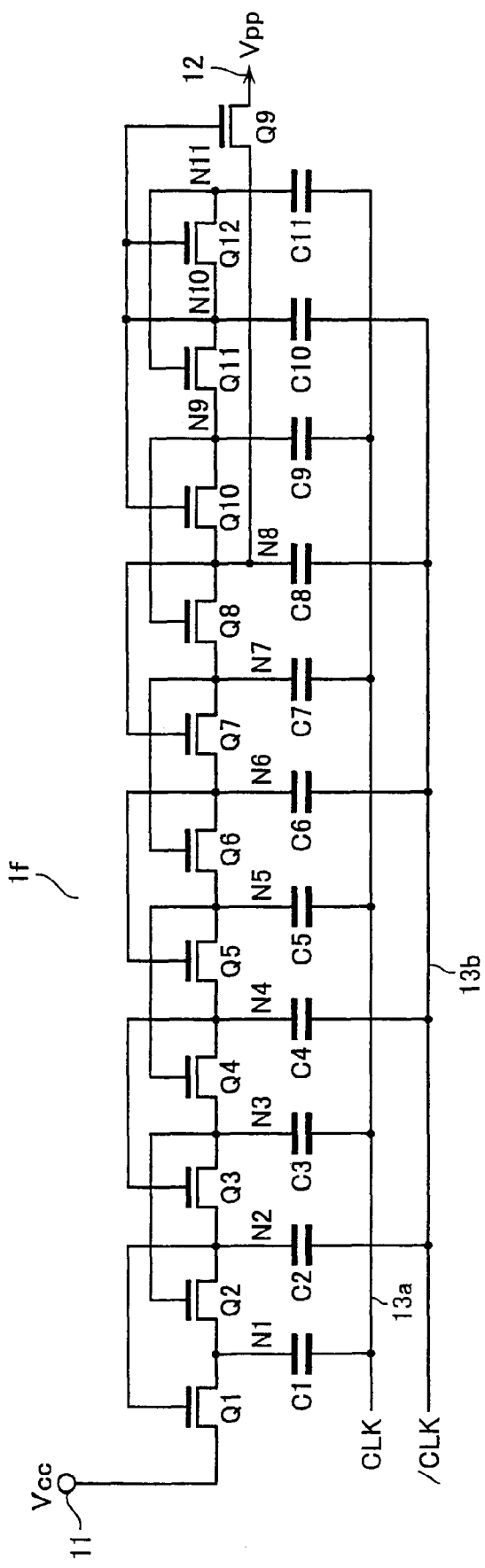
FIG. 6 shows a boost circuit in accordance with another embodiment.

To increase charge transferability of NMOS transistor Q11 by use of the similar way, the boost circuit 1f shown in FIG. 6 further has additional NMOS transistor Q12 connected to NMOS transistor Q11 in the boost circuit 1e shown in FIG. 5 and additional capacitor C11 coupled to source node of NMOS transistor Q12. Gate of NMOS transistor Q11 is connected to the node N11.

Figure 7:
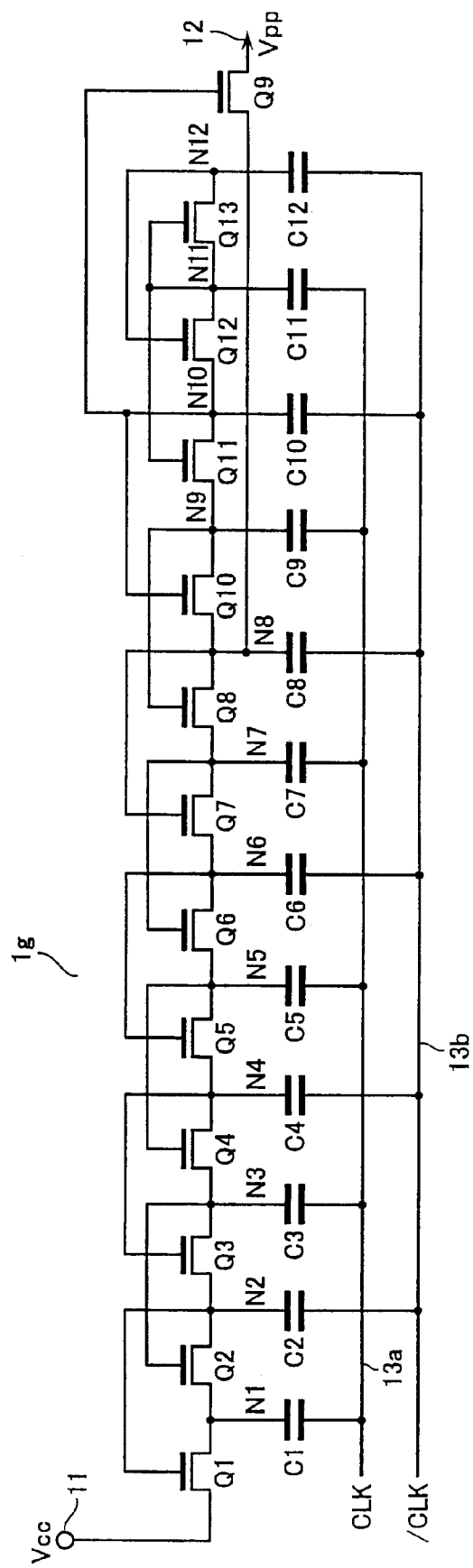
FIG. 7 shows a boost circuit in accordance with another embodiment.

To increase charge transferability of NMOS transistor Q12 by use of the similar way, the boost circuit 1g shown in FIG. 7 further has additional NMOS transistor Q13 connected to NMOS transistor Q12 in the boost circuit 1f shown in FIG. 6 and additional capacitor C12 coupled to source node of NMOS transistor Q13. Gate of NMOS transistor Q12 is connected to the node N12.

In both of the boost circuits 1f and 1g shown in FIGS. 6 and 7, gate voltage of NMOS transistor Q9 becomes higher than that in the boost circuit shown in FIG. 5, thereby increasing ability to boost voltage.

Figure 8:
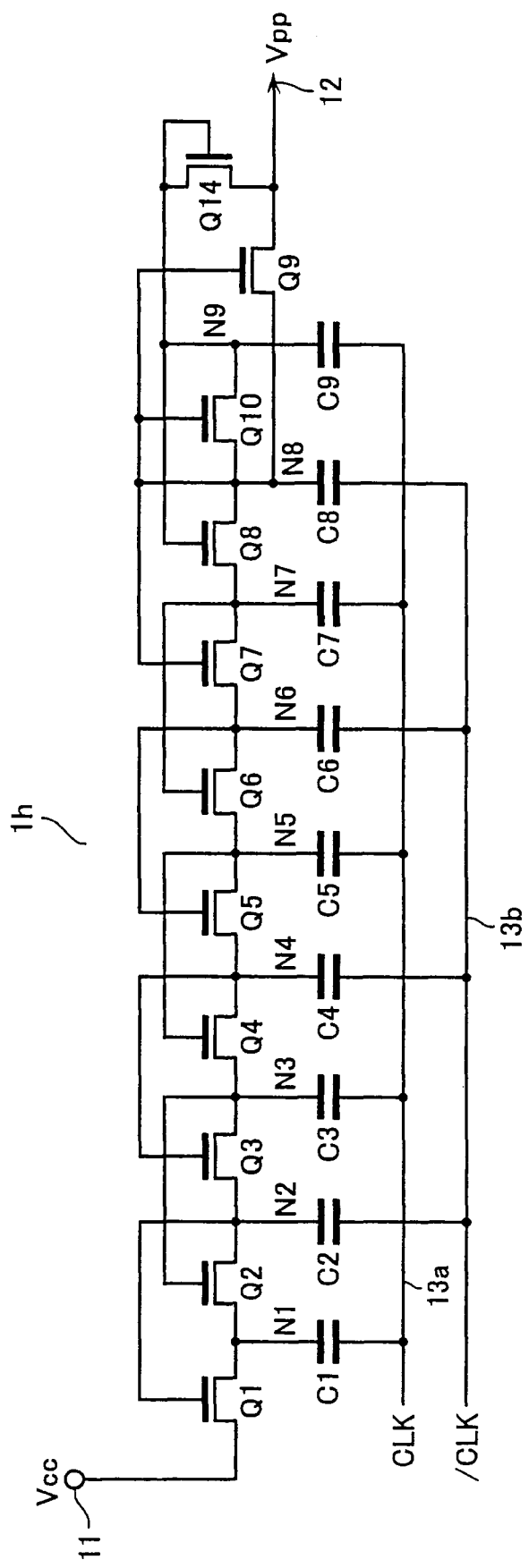
FIG. 8 shows a boost circuit in accordance with another embodiment.

Boost circuit 1h shown in FIG. 8 is a variation of the boost circuit 1d shown in FIG. 4. In this boost circuit 1h, a diode-connected NMOS transistor Q14, which serves as a voltage limiter device, is disposed between the source node N9 of transistor Q10 and Vpp node 12. In the boost circuit 1d shown in FIG. 4, the connection node N9 and Vpp node 12 are boosted in voltage as being identical with each other at the beginning of the boost operation. However, the connection node N9 has no limiters while voltage of the Vpp node 12 is limited to be a certain value, "Vpp", with a certain voltage limiter (not shown). If the node N9 is boosted in voltage to be too high, there is a fear of such a situation that NMOS transistor Q8 becomes impossible to turn off when the clock CLK driving the capacitor C8 becomes "L", and this leads to reduction of the ability of this boost circuit thereafter. By contrast, in case the transistor Q14 (threshold voltage Vth) is added as shown in FIG. 8, the upper limit voltage at the node N9 is kept as Vpp+Vth, thereby becoming to avoid the above-described inconvenience due to abnormal voltage boost at the node N9.

Figure 9:
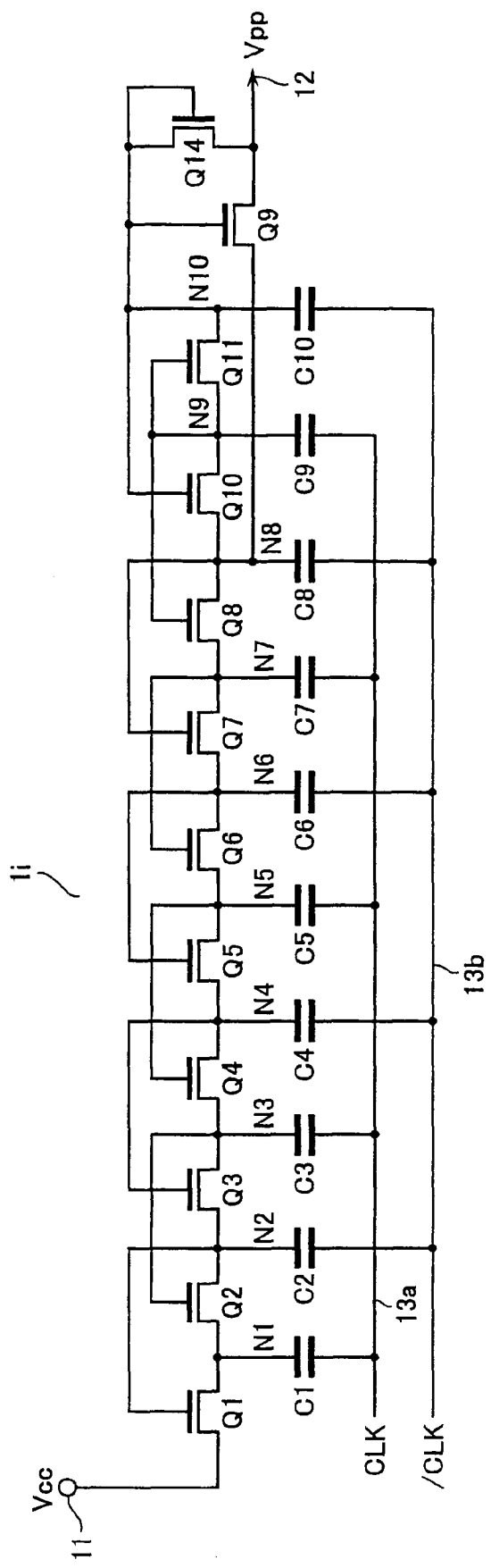
FIG. 9 shows a boost circuit in accordance with another embodiment.
Figure 10:
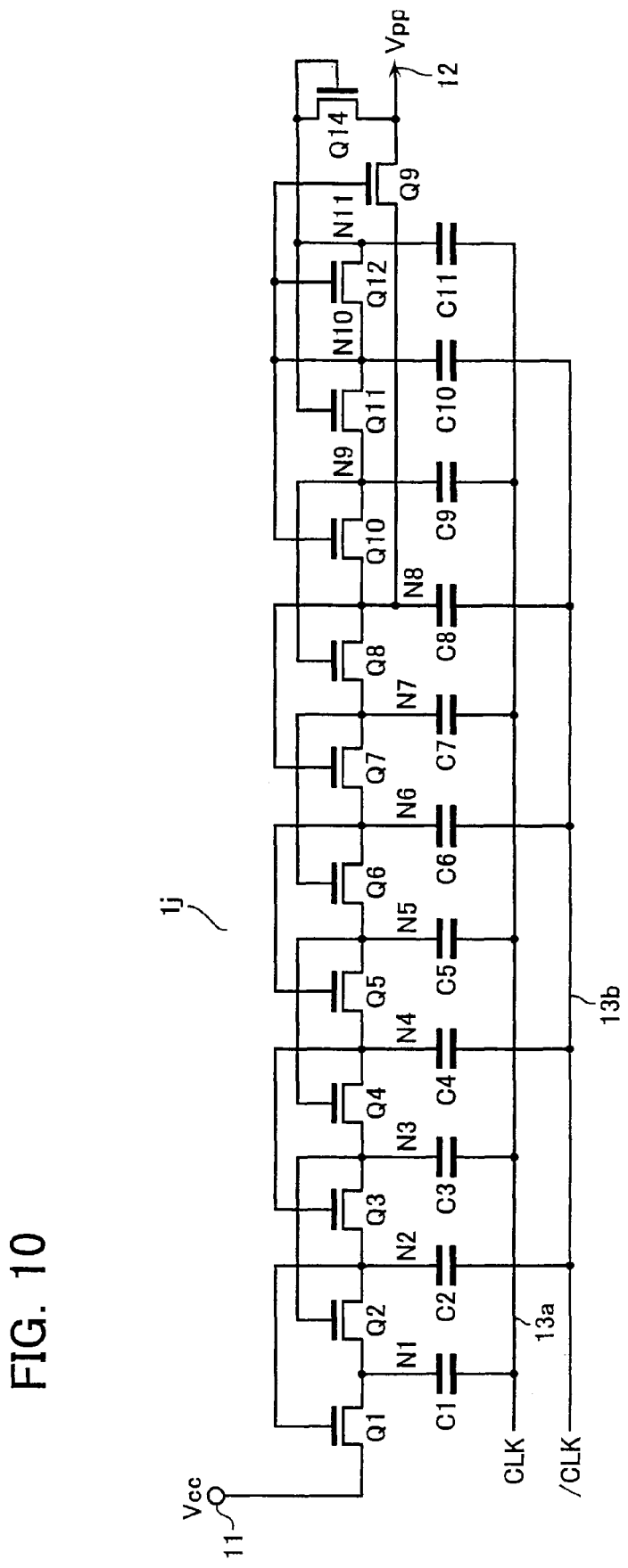
FIG. 10 shows a boost circuit in accordance with another embodiment.
Figure 11:
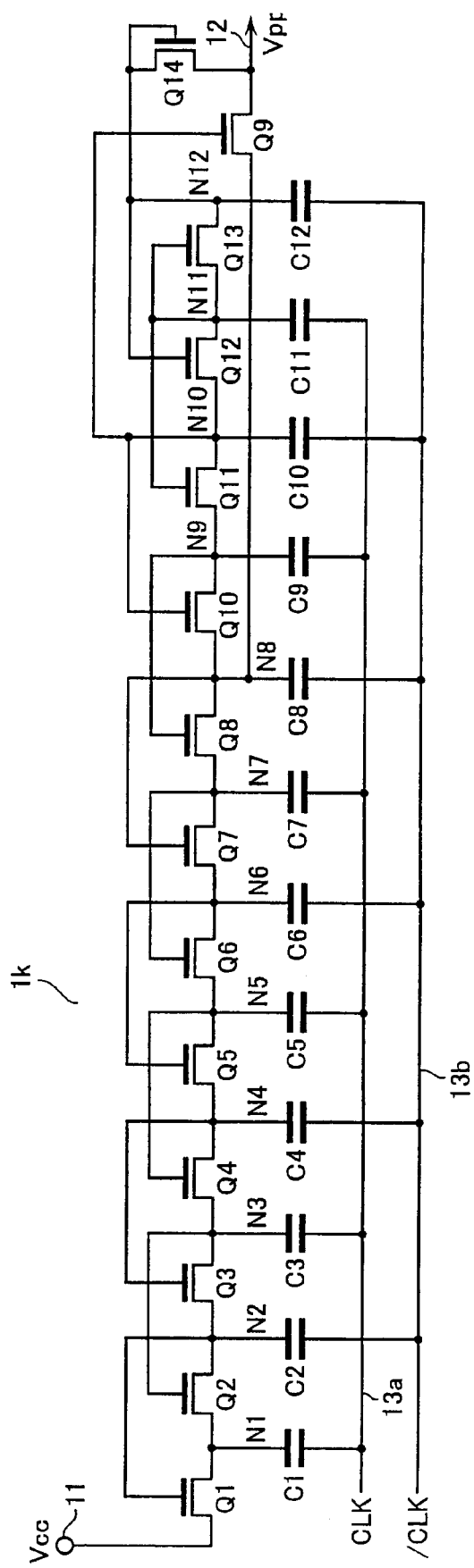
FIG. 11 shows a boost circuit in accordance with another embodiment.

Boost circuits 1i, 1j and 1k shown in FIGS. 9, 10 and 11 are variations of the boost circuits 1e, 1f and 1g shown in FIGS. 5, 6 and 7, respectively, based on the similar technique as in FIG. 8. That is, diode-connected NMOS transistor Q14 serving as a voltage limiter device is connected between each of node N10, to which gate of NMOS transistor Q10 is coupled; node N11, to which gate of NMOS transistor Q11 is coupled; and node N12, to which gate of NMOS transistor Q12 is coupled, and the Vpp node 12.

It should be noted that the present invention is effective to replace a part of the plural charge transfer stages in the above-described embodiments with a conventional boost circuit. Such the embodiments will be explained with reference to FIGS. 12 to 18 below.

Figure 12:
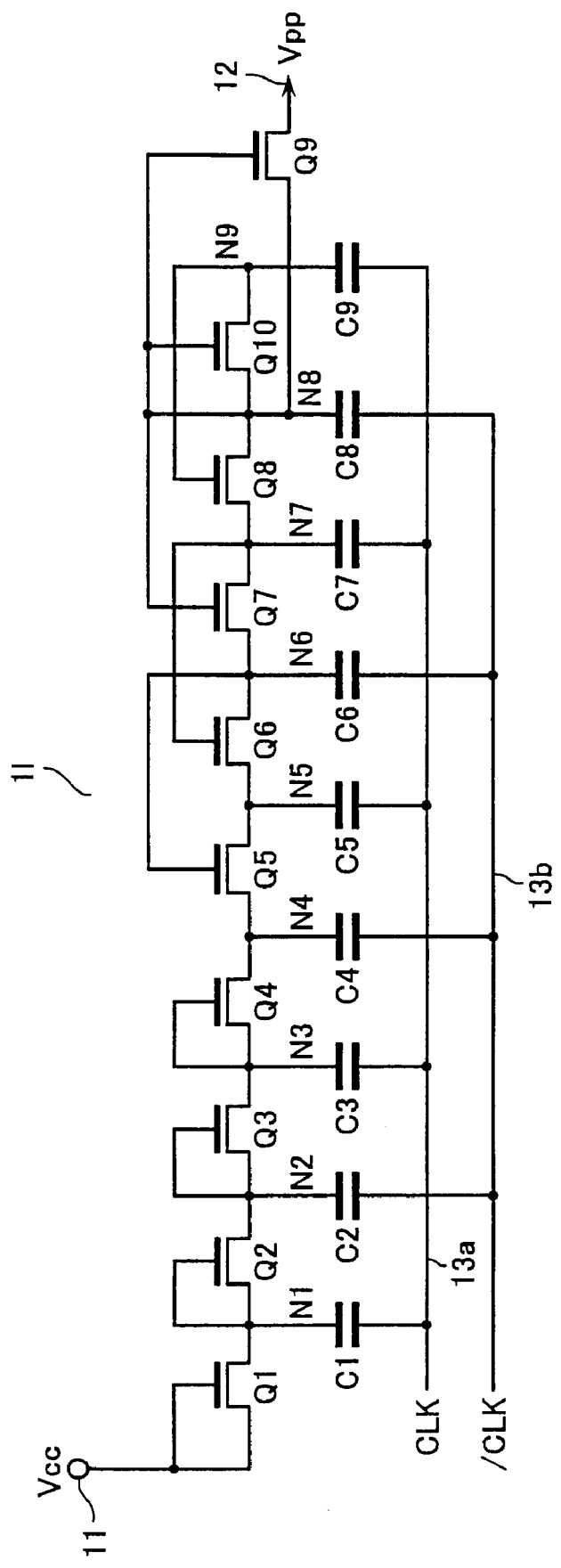
FIG. 12 shows a boost circuit in accordance with another embodiment.

Boost circuit 1l shown in FIG. 12 is a variation of the boost circuit 1d shown in FIG. 4, in which transistors Q1 to Q4 from first to fourth stages in the charge transfer circuit are diode-connected for serving as a conventional charge pump circuit. In the boost circuit with a charge pump circuit, the nearer to the Vcc node 11, the lower source/drain voltage of the transistor, i.e., the less the substantial substrate bias effect. By reason of this, in case the conventional boost scheme is adapted to some stages near the Vcc node 11, it may be achieved a relatively good boost property. In other words, in case the charge transfer circuit scheme in the above-described embodiments is adapted to some stages near the Vpp node 12, there is provided a boost circuit with high boost ability as a whole. Further, it is obtained an advantageous effect that the circuit configuration of the portion of diode-connected transistors is simple, and it is easy to form the circuit pattern.

Figure 13:
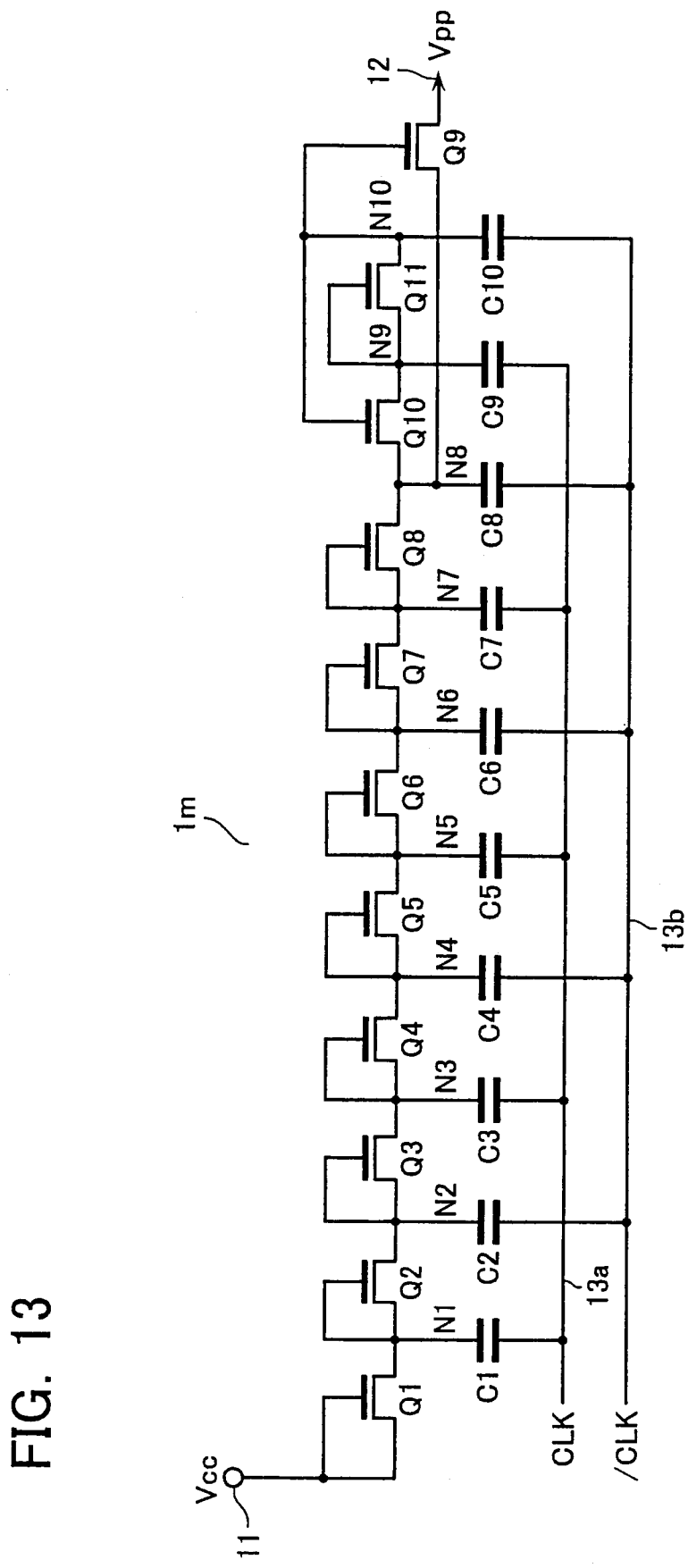
FIG. 13 shows a boost circuit in accordance with another embodiment.

Boost circuit 1m shown in FIG. 13 has the same arrangement as in FIG. 5 for a circuit portion near the Vpp node 12 including NMOS transistors Q9-Q11 while in the remaining portion from the first stage NMOS transistors Q1 to eighth stage NMOS transistor Q8, diode-connected transistors are used as in the conventional case. Since, in the boost circuit, the nearer to Vpp node 12, the higher the voltage (i.e., the larger the back gate bias effect), it is effective to improve the boost ability only in the neighborhood of the Vpp node 12. As a result, the property of the boost circuit may be improved as a whole.

Figure 14:
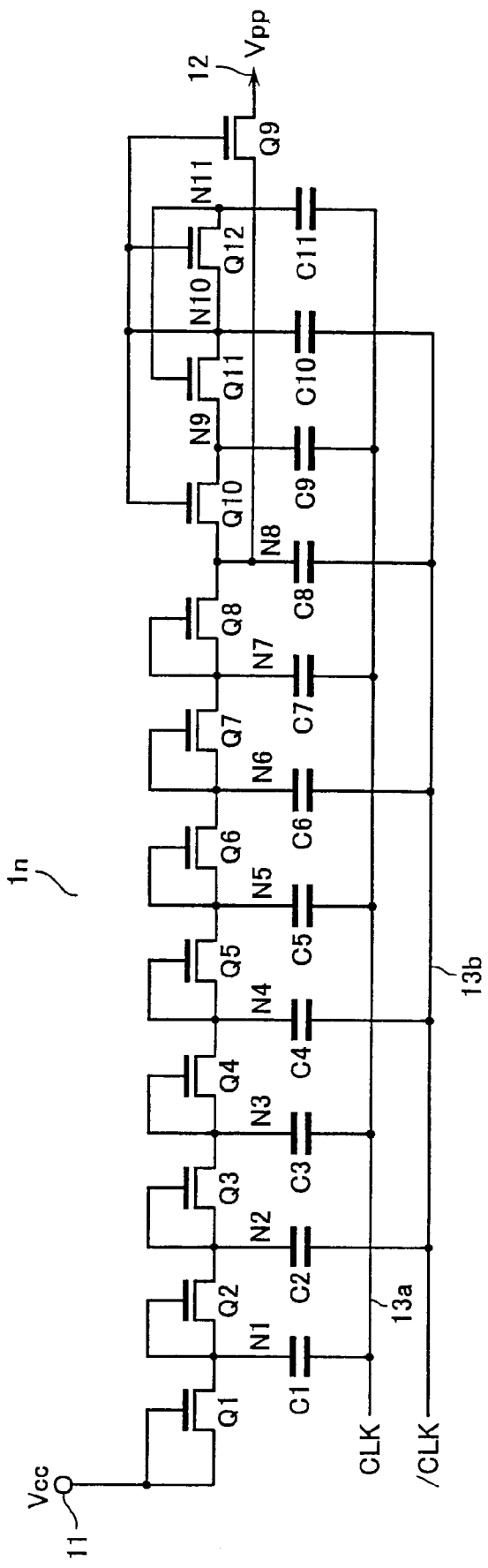
FIG. 14 shows a boost circuit in accordance with another embodiment.

Boost circuit 1n shown in FIG. 14 has the same arrangement as in FIG. 6 for a circuit portion near the Vpp node 12 including NMOS transistors Q9-Q11 while in the remaining portion from the first stage NMOS transistors Q1 to eighth stage NMOS transistor Q8, diode-connected transistors are used as in the conventional case. In this case, as similar to that shown in FIG. 13, the property of the boost circuit may be improved as a whole.

Figure 15:
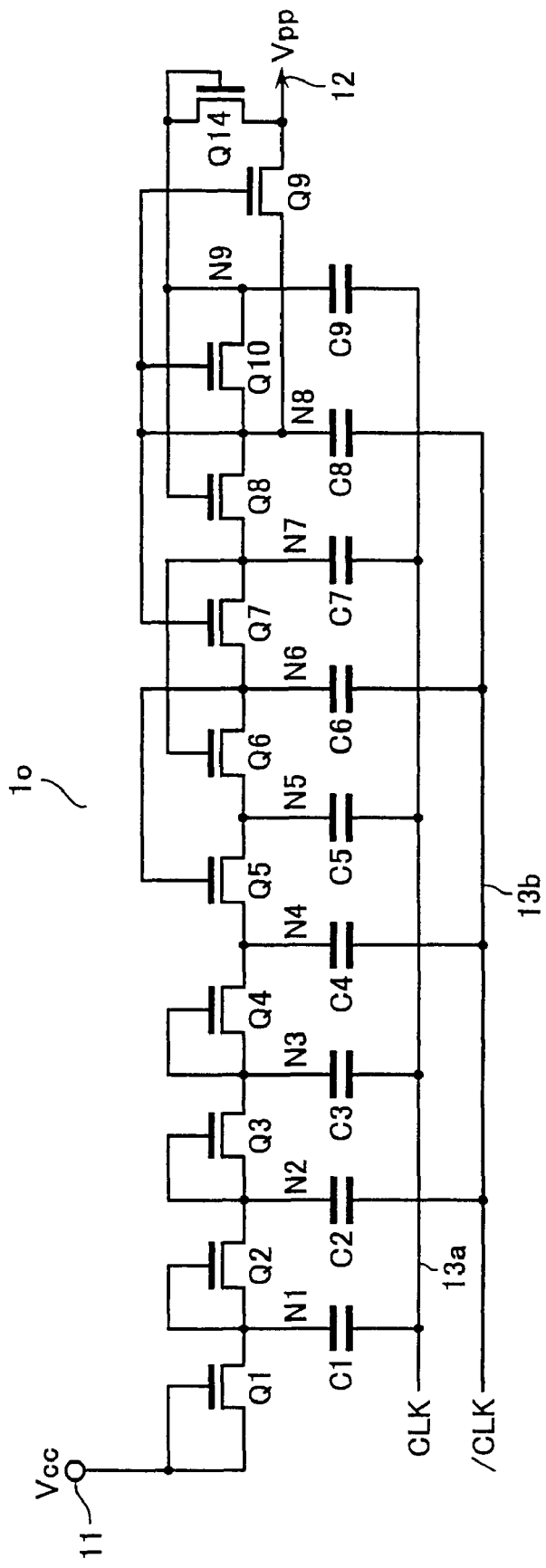
FIG. 15 shows a boost circuit in accordance with another embodiment.

Boost circuit 1o shown in FIG. 15 is a variation of the boost circuit 1h shown in FIG. 8. Like the embodiment shown in FIG. 12, diode-connected transistors are used for the first stage NMOS transistors Q1 to fourth stage NMOS transistor Q4 as similar to the conventional case. By the same reason as explained in the embodiment shown in FIG. 12, according to this embodiment, the property of the boost circuit will be improved.

Figure 16:
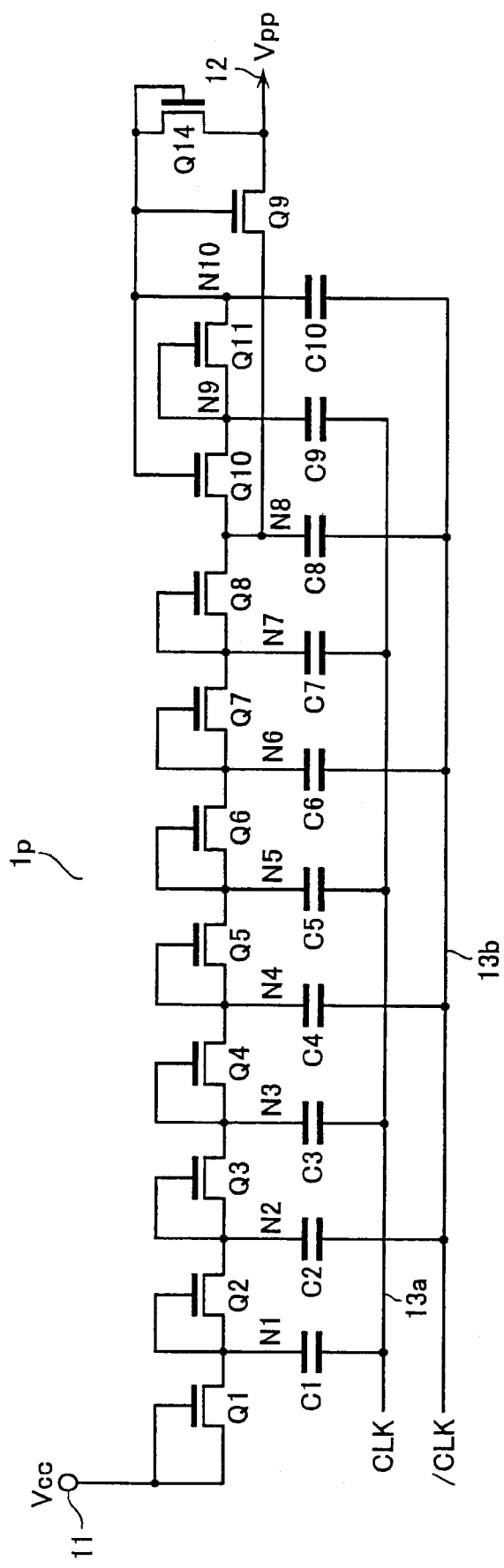
FIG. 16 shows a boost circuit in accordance with another embodiment.

Boost circuit 1p shown in FIG. 16 has the same arrangement as the boost circuit 1i shown in FIG. 9 for a circuit portion near the Vpp node 12 including NMOS transistors Q9-Q11 and Q14 while in the remaining portion from the first stage NMOS transistors Q1 to eighth stage NMOS transistor Q8, diode-connected transistors are used as in the conventional case.

Figure 17:
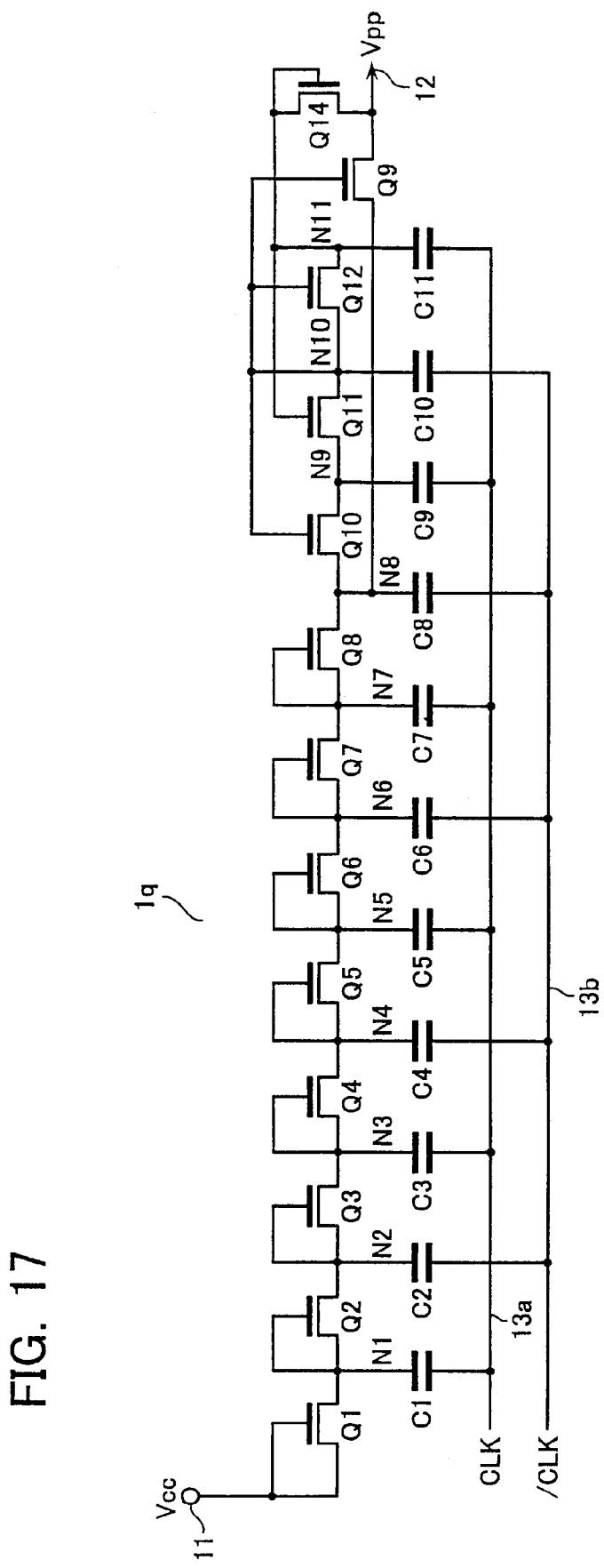
FIG. 17 shows a boost circuit in accordance with another embodiment.

Boost circuit 1q shown in FIG. 17 has the same arrangement as the boost circuit 1j shown in FIG. 10 for a circuit portion near the Vpp node 12 including NMOS transistors Q9-Q11 and Q14 while in the remaining portion from the first stage NMOS transistors Q1 to eighth stage NMOS transistor Q8, diode-connected transistors are used as in the conventional case.

Figure 18:
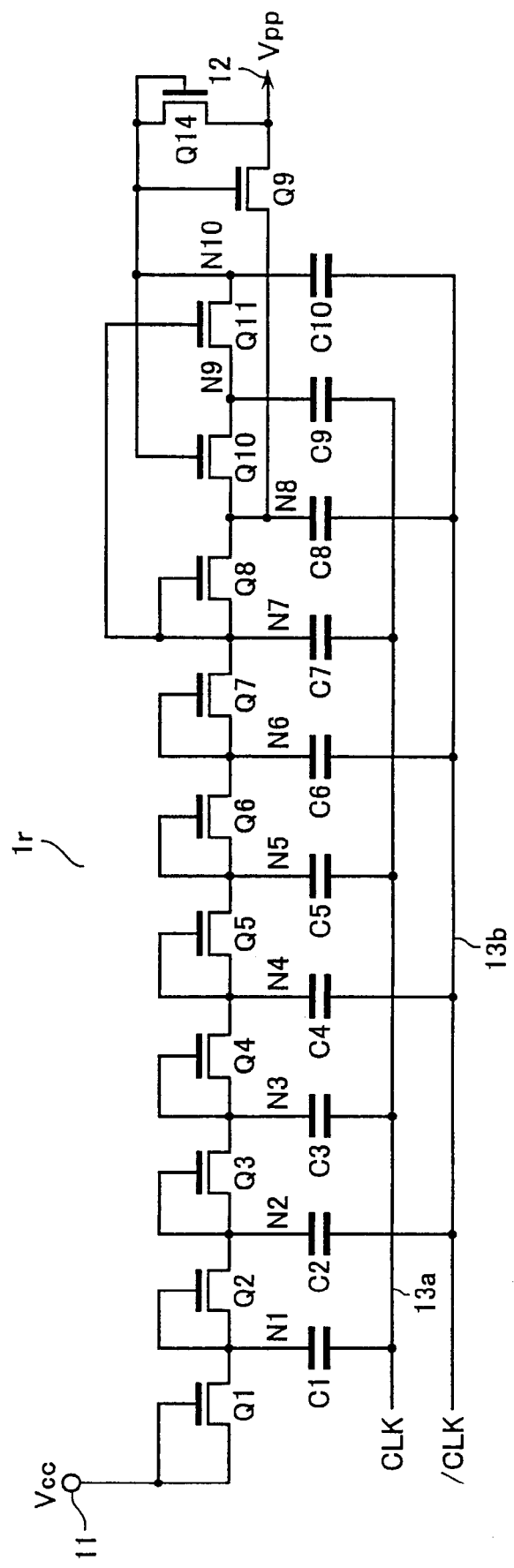
FIG. 18 shows a boost circuit in accordance with another embodiment.

Boost circuit 1r shown in FIG. 18 has the same arrangement as the boost circuit 1i shown in FIG. 9 for a circuit portion near the Vpp node 12 including NMOS transistors Q9-Q11 and Q14 while in the remaining portion from the first stage NMOS transistors Q1 to eighth stage NMOS transistor Q8, diode-connected transistors are used as in the conventional case. Note here that gate of NMOS transistor Q11 is coupled to the node N7 in this embodiment while it is coupled to the node N9 driven by capacitor C9 in FIG. 9.

According to these embodiments shown in FIGS. 16-18, boost property may be improved by the same reason as in FIG. 14.

A boost circuit in accordance with the present invention may be formed of two series of boost circuits disposed in parallel, in which the conventional boost scheme may be adapted to a part thereof. Such the embodiments will be explained with reference to FIGS. 19-24 below.

Figure 19:
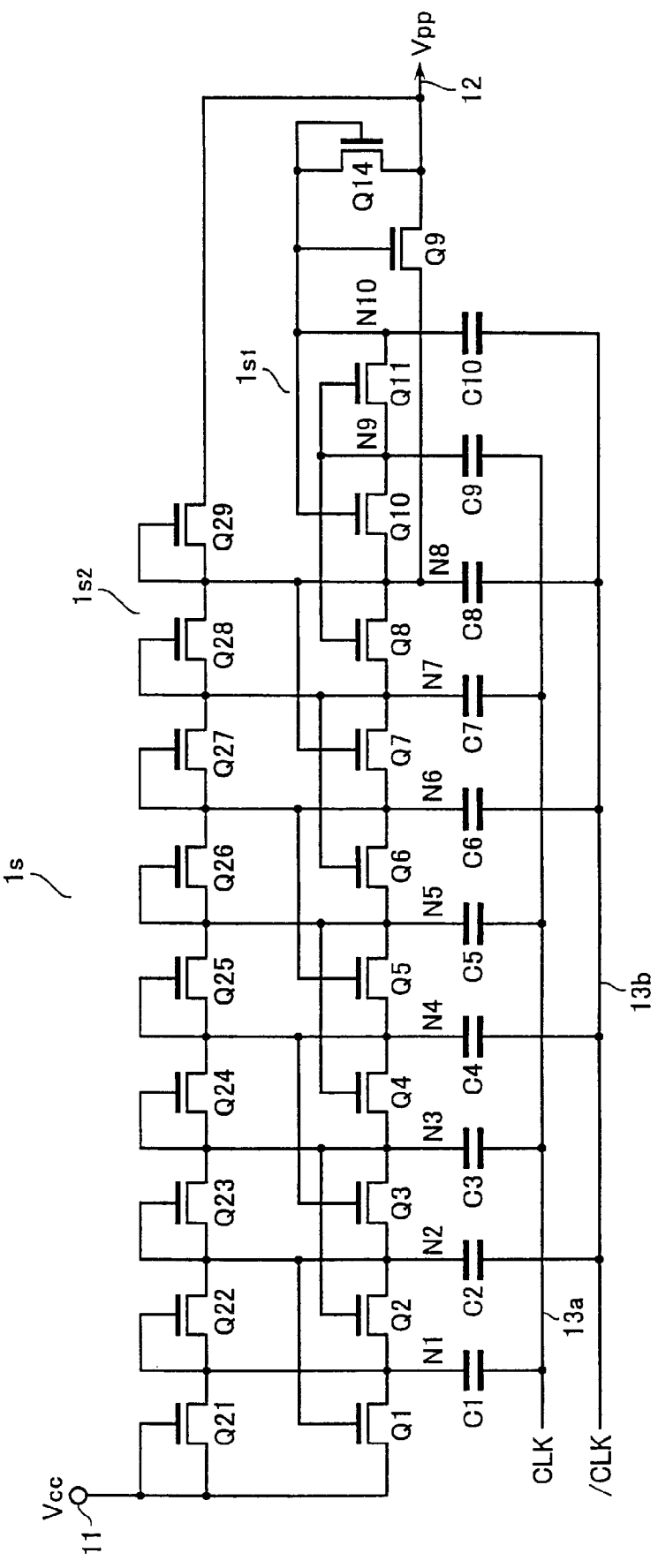
FIG. 19 shows a boost circuit in accordance with another embodiment.

Boost circuit is shown in FIG. 19 has two charge transfer circuits 1s1 and 1s2, which are disposed between the Vcc node 11 and Vpp node 12 in parallel with each other. The charge transfer circuit 1s1 is the same as boost circuit 1i in the embodiment shown in FIG. 9. The charge transfer circuit 1s2 is arranged with the conventional boost scheme. That is, NMOS transistors Q21-Q29 in the circuit 1s2 are connected in series, in each of which gate and drain are connected to each other (i.e., diode-connected). Capacitors C1-C8 are used in common to the two systems. According to this embodiment, there is provided a boost circuit with further improved boost ability.

Figure 20:
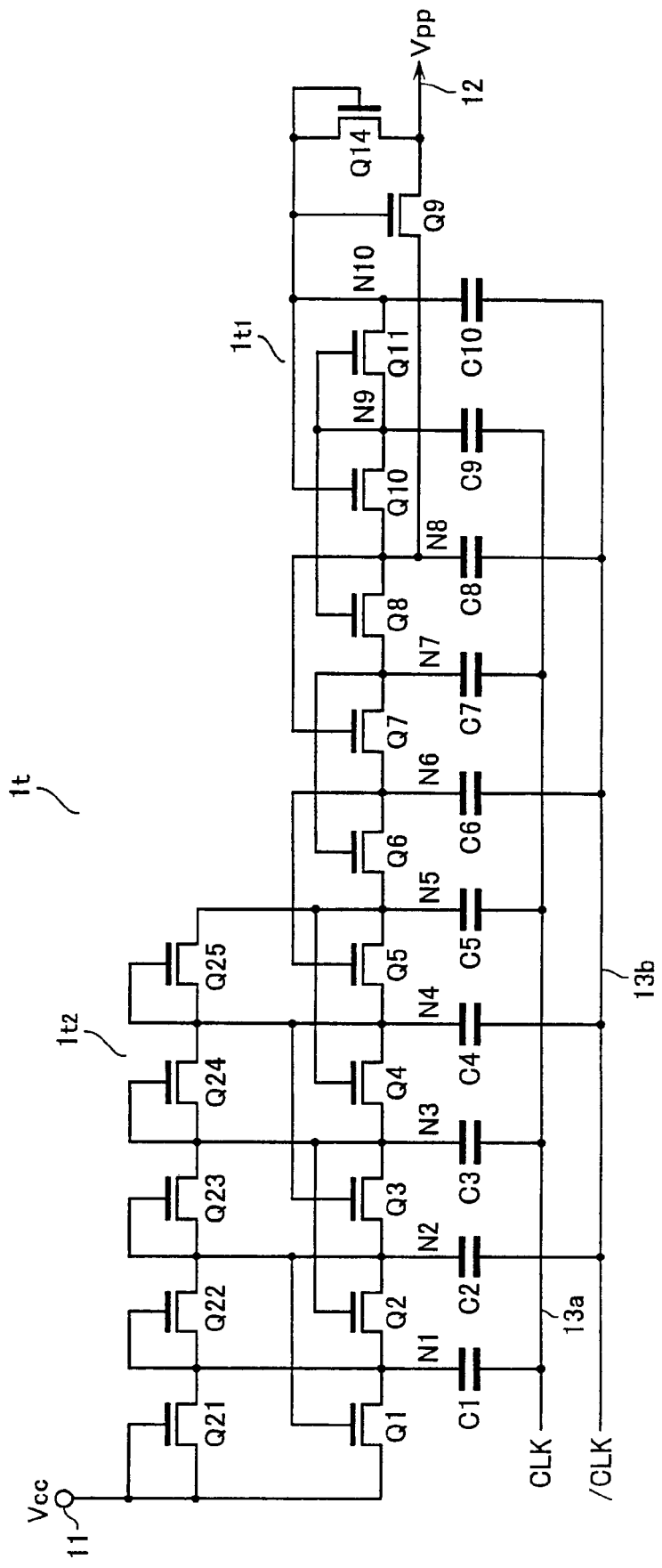
FIG. 20 shows a boost circuit in accordance with another embodiment.

Boost circuit $1t$ shown in FIG. 20 has a charge transfer circuit $1t1$ with the same arrangement as boost circuit $1i$ shown in FIG. 9, and another charge transfer circuit $1t2$ with the conventional boost scheme is disposed in parallel with a part of the charge transfer circuit $1t1$, i.e., a portion from the first stage to a predetermined stage thereof. The charge transfer circuit $1t2$ is formed of diode-connected NMOS transistors Q21-Q25. Capacitors C1-C5 are used in common to these two charge transfer circuits.

With this arrangement, charge transferability near the Vcc node 11 may be further improved in comparison with the embodiment shown in FIG. 9, and it is provided a boost circuit with a good boost property.

Figure 21:
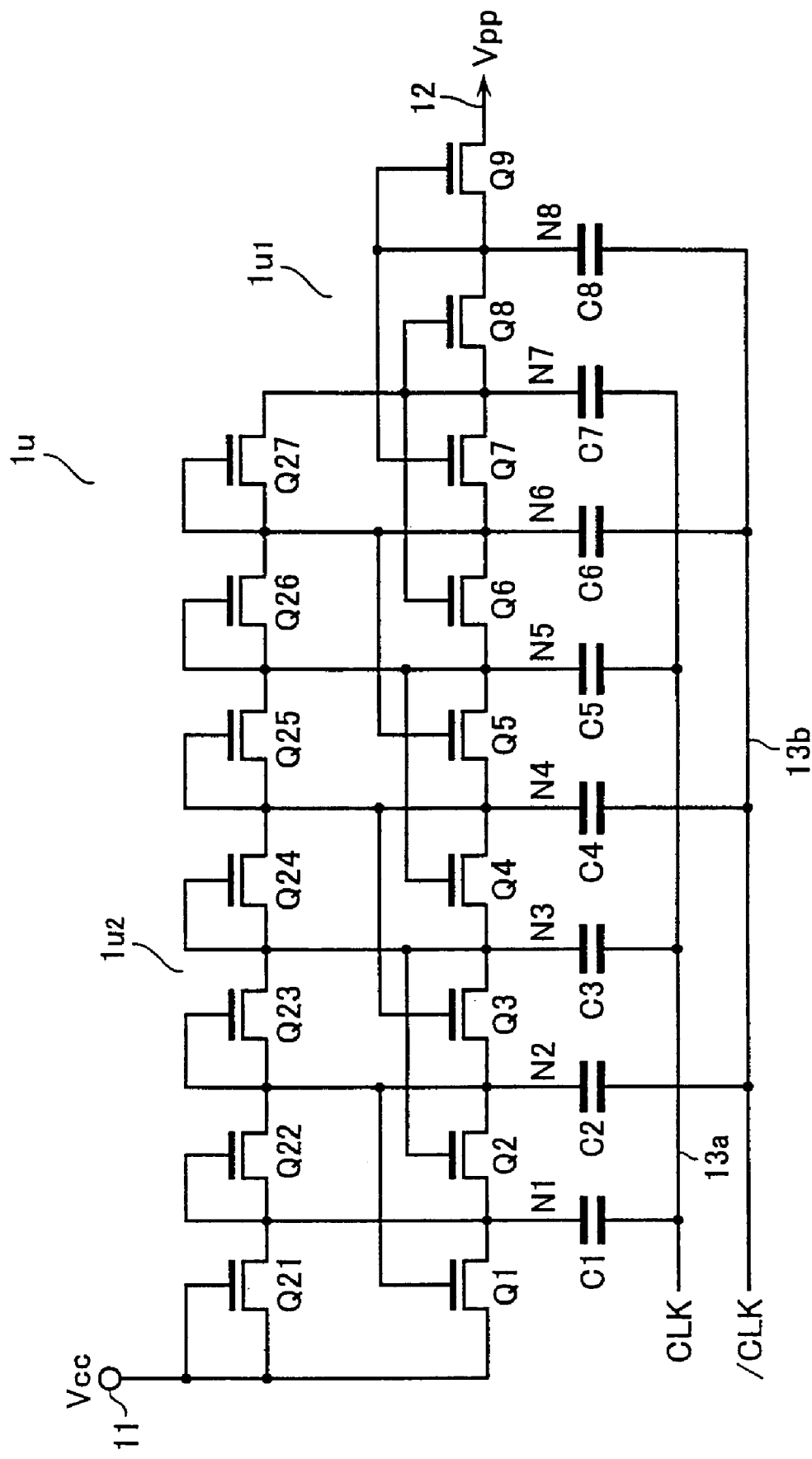
FIG. 21 shows a boost circuit in accordance with another embodiment.

Boost circuit $1u$ shown in FIG. 21 has a charge transfer circuit $1u1$ with the same arrangement as boost circuit $1a$ shown in FIG. 1, and another charge transfer circuit $1u2$ with the conventional boost scheme is disposed in parallel with a main portion of (not the entire stages of) the charge transfer circuit $1u1$, i.e., a portion from Vcc node 11 to node N7. The charge transfer circuit $1u2$ is formed of diode-connected NMOS transistors Q21-Q27. Capacitors C1-C5 are used in common to these two charge transfer circuits. With this arrangement, charge transferability may be further improved in comparison with the embodiment shown in FIG. 1, whereby it is provided a boost circuit with a good boost property.

Figure 22:
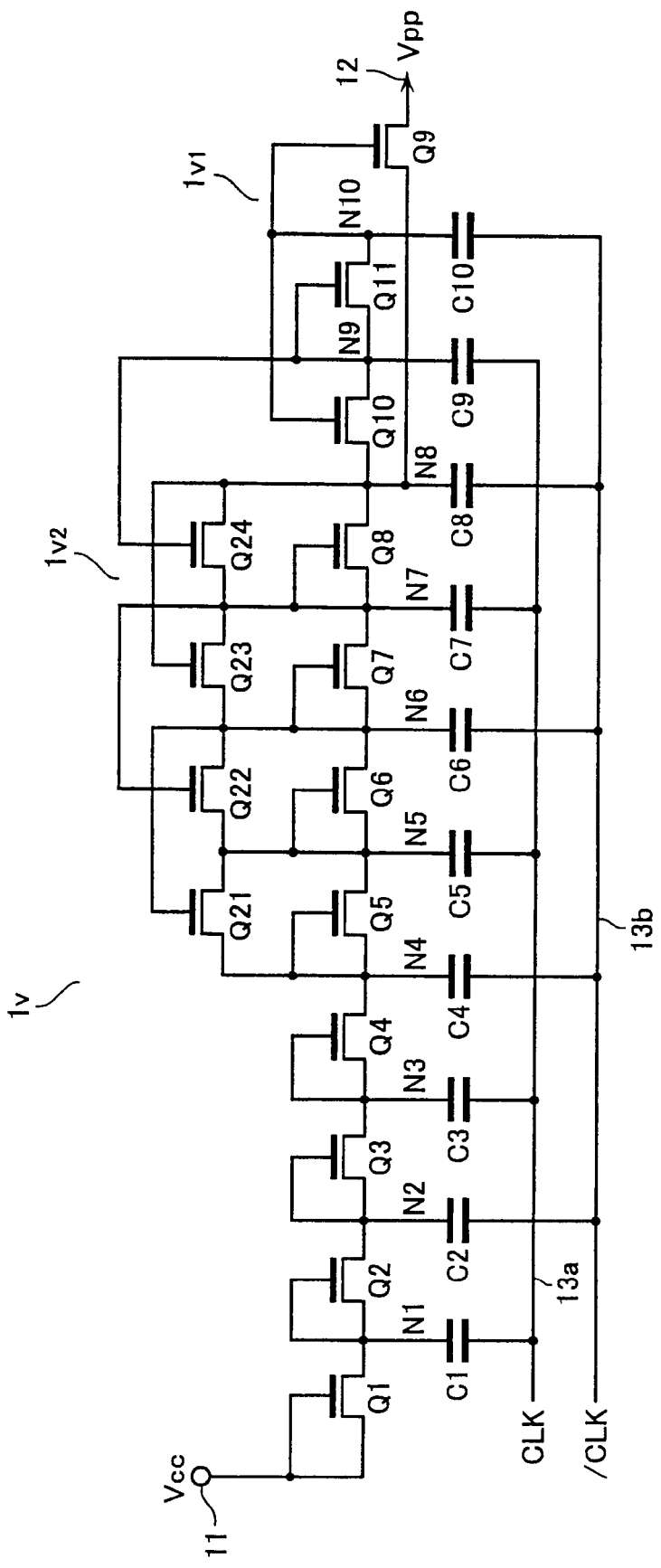
FIG. 22 shows a boost circuit in accordance with another embodiment.

Boost circuit $1v$ shown in FIG. 22 has a charge transfer circuit $1v1$ with the same arrangement as boost circuit $1m$ shown in FIG. 13, and another charge transfer circuit $1v2$ is disposed in parallel with a certain middle stages of the charge transfer circuit $1v1$. That is, the charge transfer circuit $1v2$ has transfer NMOS transistors Q21-Q24, which are disposed in parallel with the NMOS transistors Q5-Q8, respectively, in the latter half portion of transfer transistors Q1-Q8 in the charge transfer circuit $1v1$, in such a way that capacitors C4-C8 are used in common to the two circuits.

Gates of NMOS transistors Q21-Q24 are coupled to source nodes N6-N9 of the following transistors, respectively, like the embodiment shown in FIG. 1. The charge transfer circuit $1v2$ has such improved charge transferability that it is provided a boost circuit with a higher boost property as a whole in comparison with the embodiment shown in FIG. 13.

Figure 23:
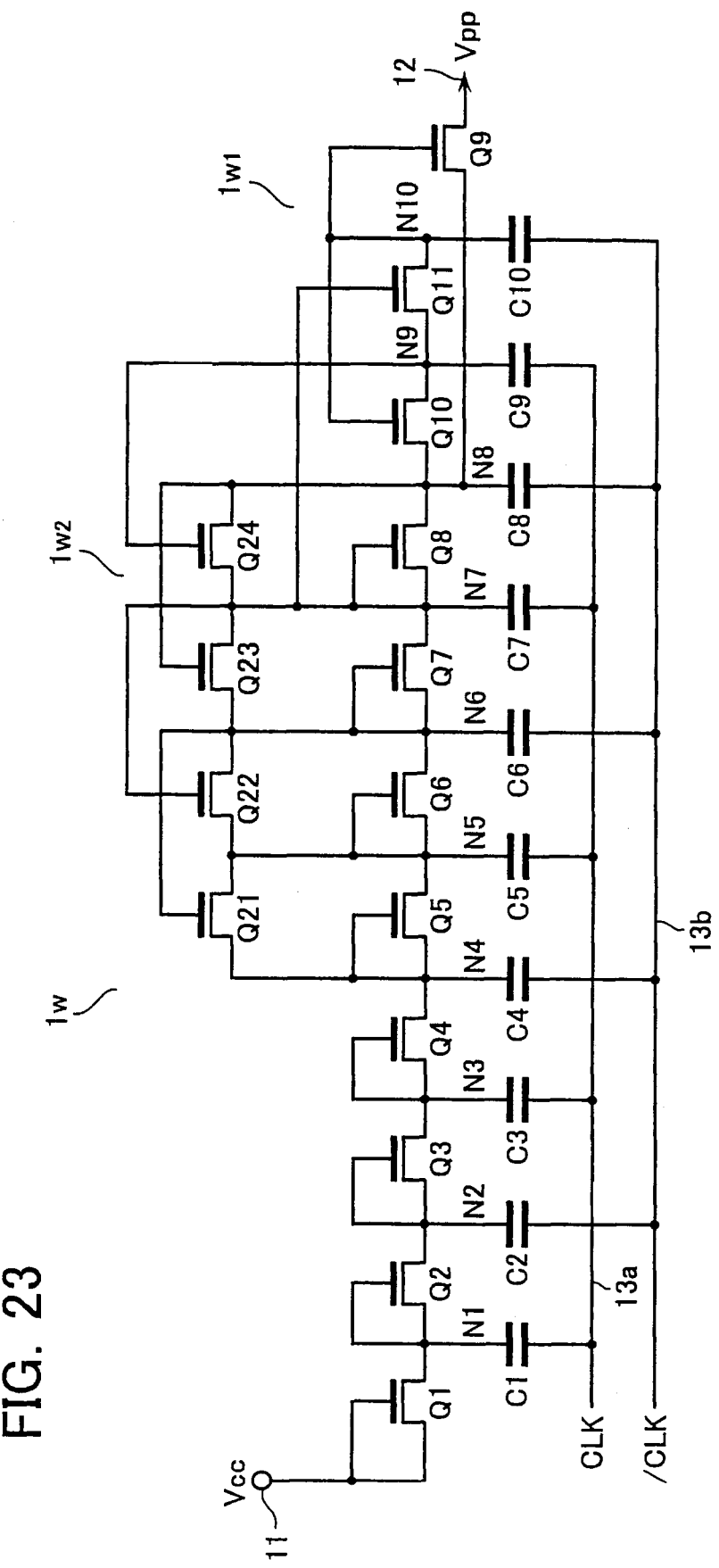
FIG. 23 shows a boost circuit in accordance with another embodiment.

Boost circuit $1w$ shown in FIG. 23, has charge transfer circuits $1w1$ and $1w2$ disposed in parallel, which has approximately the same configuration as the boost circuit $1v$ shown in FIG. 22. Difference between them is in a that gate of NMOS transistor Q11 in the boost circuit $1v$ shown in FIG. 22 is coupled to the node N9 while gate of NMOS transistor Q11 in the boost circuit $1w$ shown in FIG. 23 is coupled to the node N7. Charge transfer circuits $1v2$ and $1w2$ has the same arrangement. According to this embodiment, high boost ability may be obtained.

Figure 24:
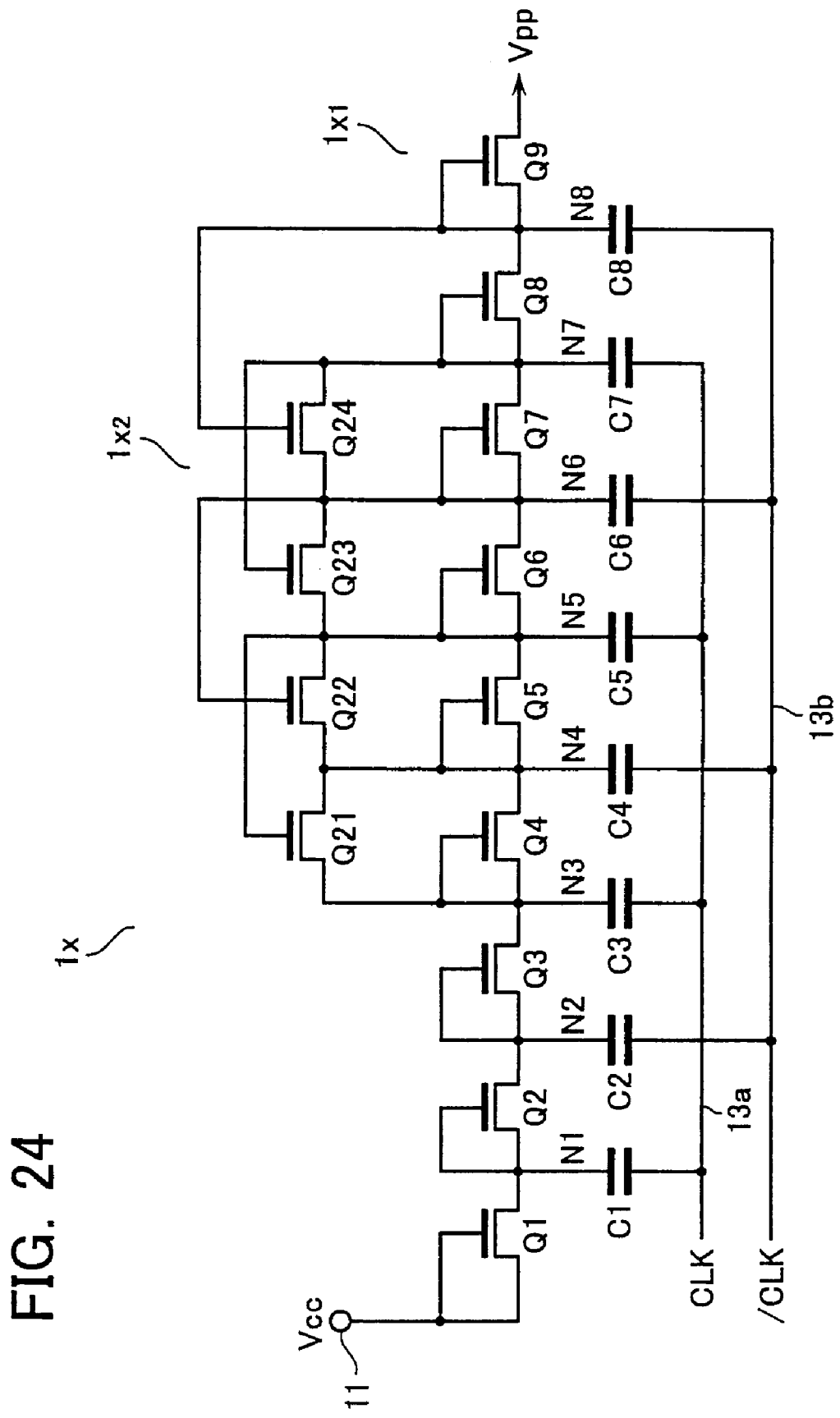
FIG. 24 shows a boost circuit in accordance with another embodiment.

Boost circuit $1x$ shown in FIG. 24 has a charge transfer circuit $1x1$ with the conventional scheme and another charge transfer circuit $1x2$ disposed in parallel with the latter half portion of the charge transfer circuit $1x1$. The charge transfer circuit $1x2$ has the same arrangement as the charge transfer circuits $1v2$ and $1w2$ shown in FIGS. 22 and 23. With this arrangement, ability in charge transfer at the high voltage portion of the boost circuit is improved, and high boost ability may be obtained.

Figure 25:
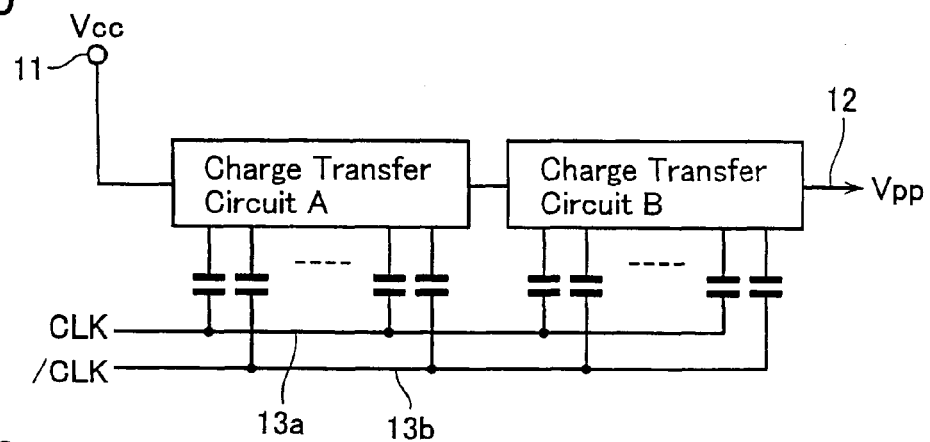
FIG. 25 shows a schematic configuration of a boost circuit in accordance with another embodiment, in which two types of charge transfer circuits are connected in series.

The embodiments shown in FIGS. 12 to 18 will be summarized as follows: as shown in FIG. 25, two kinds of charge transfer circuits A and B are disposed in series between the Vcc node3 11 and Vpp node 12, and particularly the former charge transfer circuit A is arranged with the conventional scheme.

Figure 26:
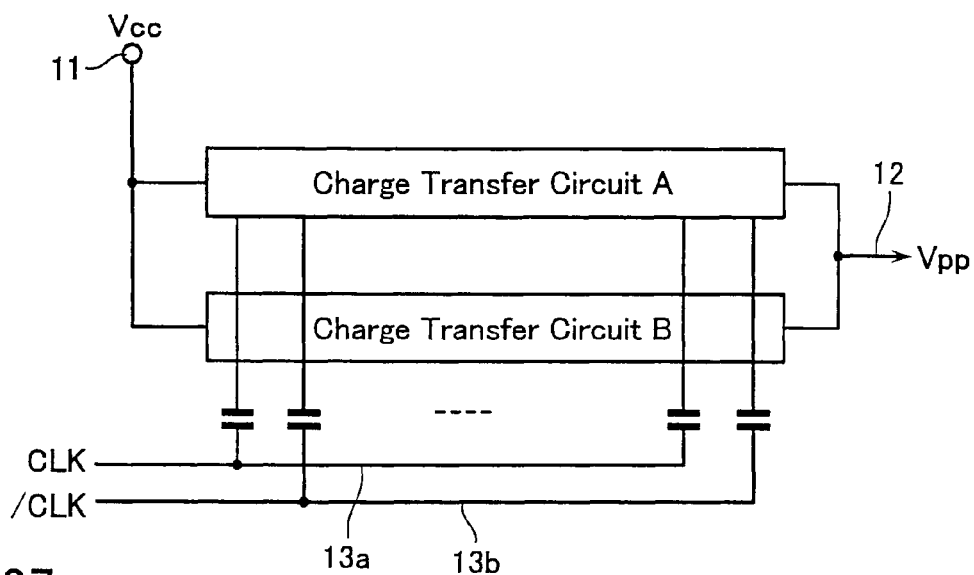
FIG. 26 shows a schematic configuration of a boost circuit in accordance with another embodiment, in which two types of charge transfer circuits are connected in parallel with each other.

By contrast, the embodiments shown in FIGS. 19 to 24 will be summarized as follows: as shown in FIG. 26, two kinds of charge transfer circuits A and B are disposed in parallel with each other between the Vcc node3 11 and Vpp node 12, and particularly one of them is arranged with the conventional scheme. In the embodiment shown in FIG. 19, two charge transfer circuits A and B are independent of each other while in the embodiments shown in FIGS. 20-24, two charge transfer circuits A and B share some transfer stages.

Figure 27:
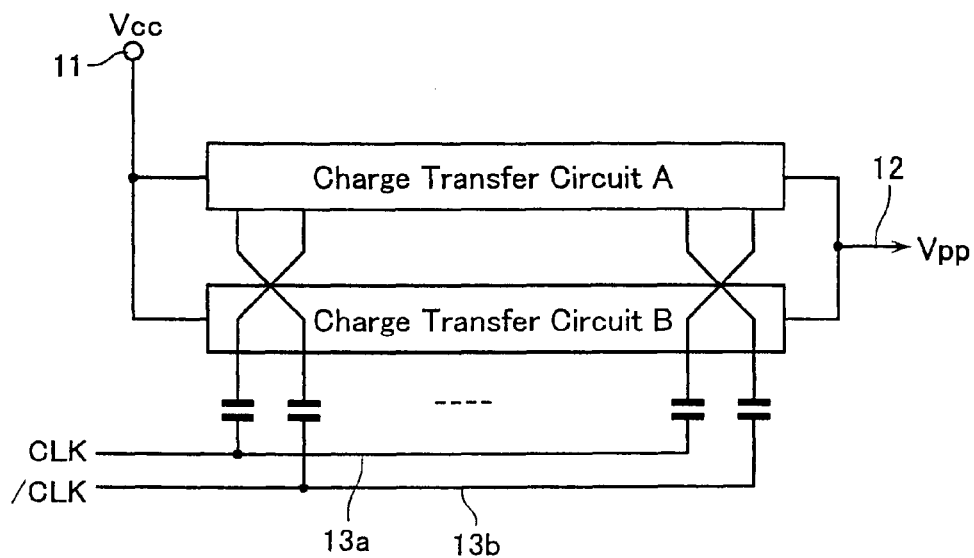
FIG. 27 shows a boost circuit in accordance with another embodiment, in which two types of charge transfer circuits are connected in parallel with each other.

Further, in a case where two kinds of charge transfer circuits A and B are disposed between Vcc node 11 and Vpp node 12, it may be arranged in such a way that the corresponding stages in these circuits A and B are driven in reverse phase as shown in FIG. 27. For example, the final stages of the charge transfer circuits A and B are driven by clocks CLK and /CLK, respectively. With this arrangement, as a result of that timings of charge transferring to Vpp node 12 in the charge transfer circuits A and B are different from each other, the variation of the boosted output voltage may be suppressed in level.

It should be appreciated that the method shown in FIG. 27 is effective not only in a case where the conventional scheme is adapted to one of two charge transfer circuits A and B as in the embodiments shown in FIG. 19-24 but also in another case where both of two charge transfer circuits are, for example, formed in accordance with the embodiments shown in FIGS. 1-11 as different from the conventional ones. Further, although there is not shown in the drawings, it is useful to arrange three or more charge transfer circuits in parallel with each other between the Vcc node 11 and Vpp node 12.

In the embodiments described above, gate of NMOS transistor Qi (No. i from the Vcc node 11) is coupled to source of NMOS transistor Qi+1 (No. i+1), i.e., drain of NMOS transistor Qi+2 (No. i+2) (i.e., connection node Ni+1). This is based on such a basic theory that gate of a certain stage transistor Qi is coupled to drain of another stage transistor disposed on the side of Vpp node 12, which is driven by the same phase clock as the drain of transistor Qi. It is possible to further develop the embodiments described above.

Figure 28:
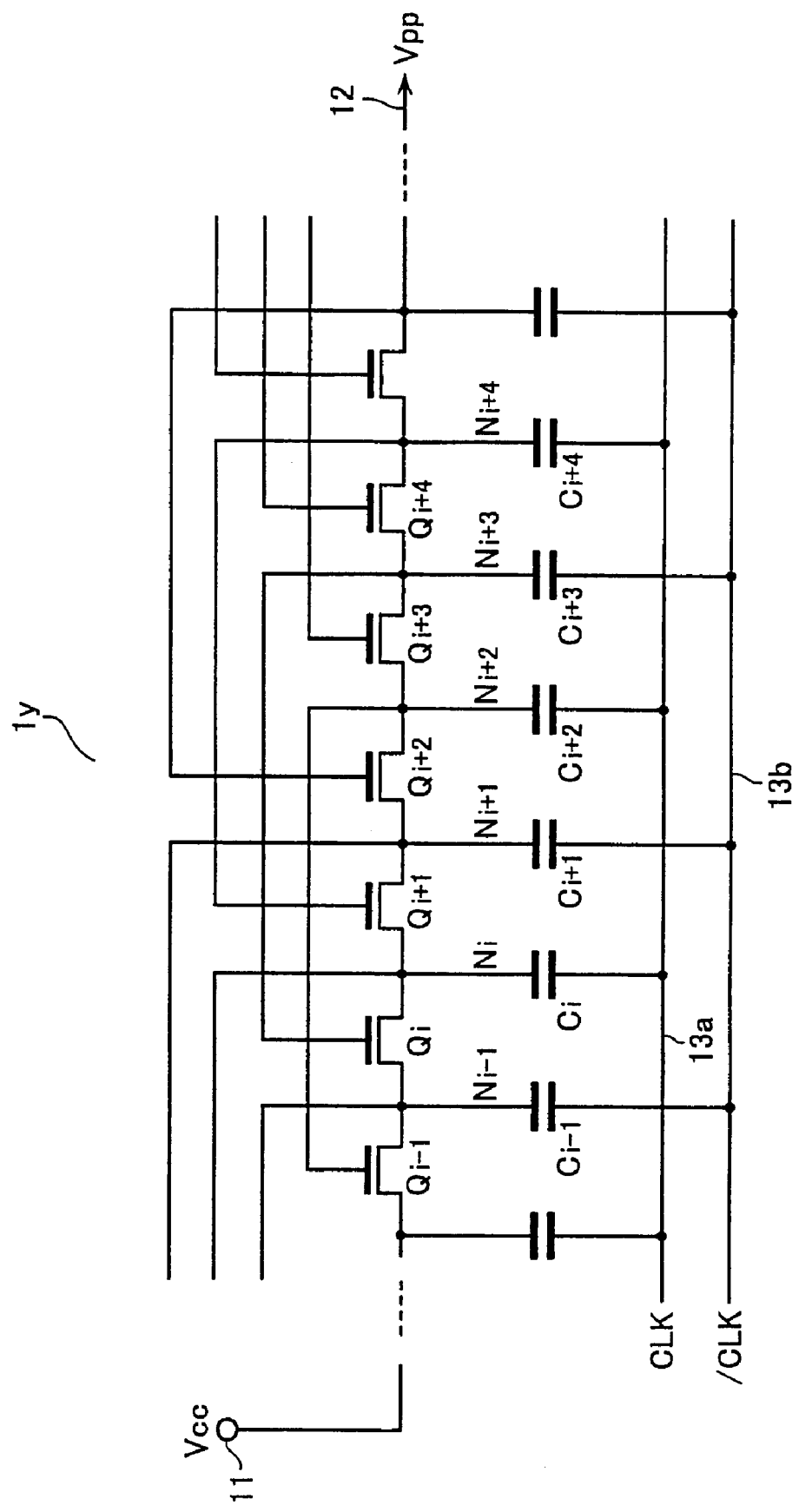
FIG. 28 shows a boost circuit in accordance with another embodiment.

FIG. 28 shows a main portion of a boost circuit $1y$ in accordance with another embodiment. With giving attention to transistor Qi, gate thereof is coupled to a connection node Ni+3, to which source of transistor Qi+3 and drain of transistor Qi+4 are connected in common. The transistor Qi+3 is one, which is not adjacent to transistor Q1 but farther from it as nearer to Vpp node 12 than the above-described embodiments. This is the same for remaining transistors. With this arrangement, gate and drain of each stage transistor are driven with the same phase, so a boost operation may be performed with high ability.

Figure 29:
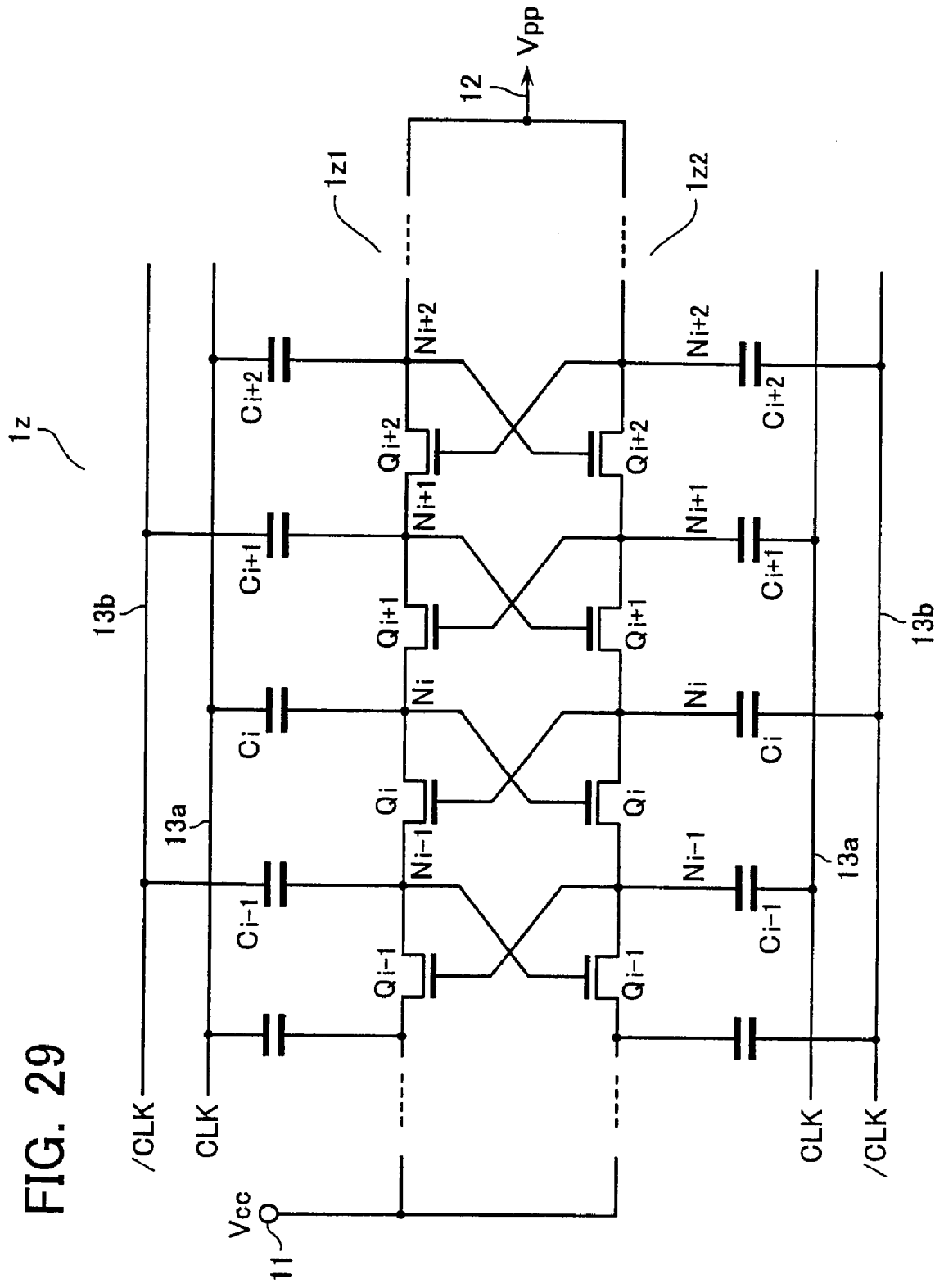
FIG. 29 shows a boost circuit in accordance with another embodiment.

FIG. 29 shows a main portion of a boost circuit $1z$ in accordance with another embodiment. This boost circuit $1z$ has two series of charge transfer circuits $1z1$ and $1z2$, the corresponding stages of which are driven by reverse phases. Capacitors are prepared for the charge transfer circuits $1z1$ and $1z2$, respectively.

Gate of NMOS transistor Qi in the first charge transfer circuit $1z1$ is coupled to the connection node Ni between the corresponding NMOS transistor Qi and the following NMOS transistor Qi+1 in the second charge transfer circuit $1z2$, which is driven with the same phase as transistor Qi in the first charge transfer circuit. Gate of NMOS transistor Qi in the second charge transfer circuit $1z2$ is coupled to the connection node Ni between the corresponding NMOS transistor Qi and the following NMOS transistor Qi+1 in the first charge transfer circuit 1z1, which is driven with the same phase as transistor Qi in the second charge transfer circuit 1z2. With respect to the remaining transfer stages, the same gate connections as described above are used.

Figure 30:
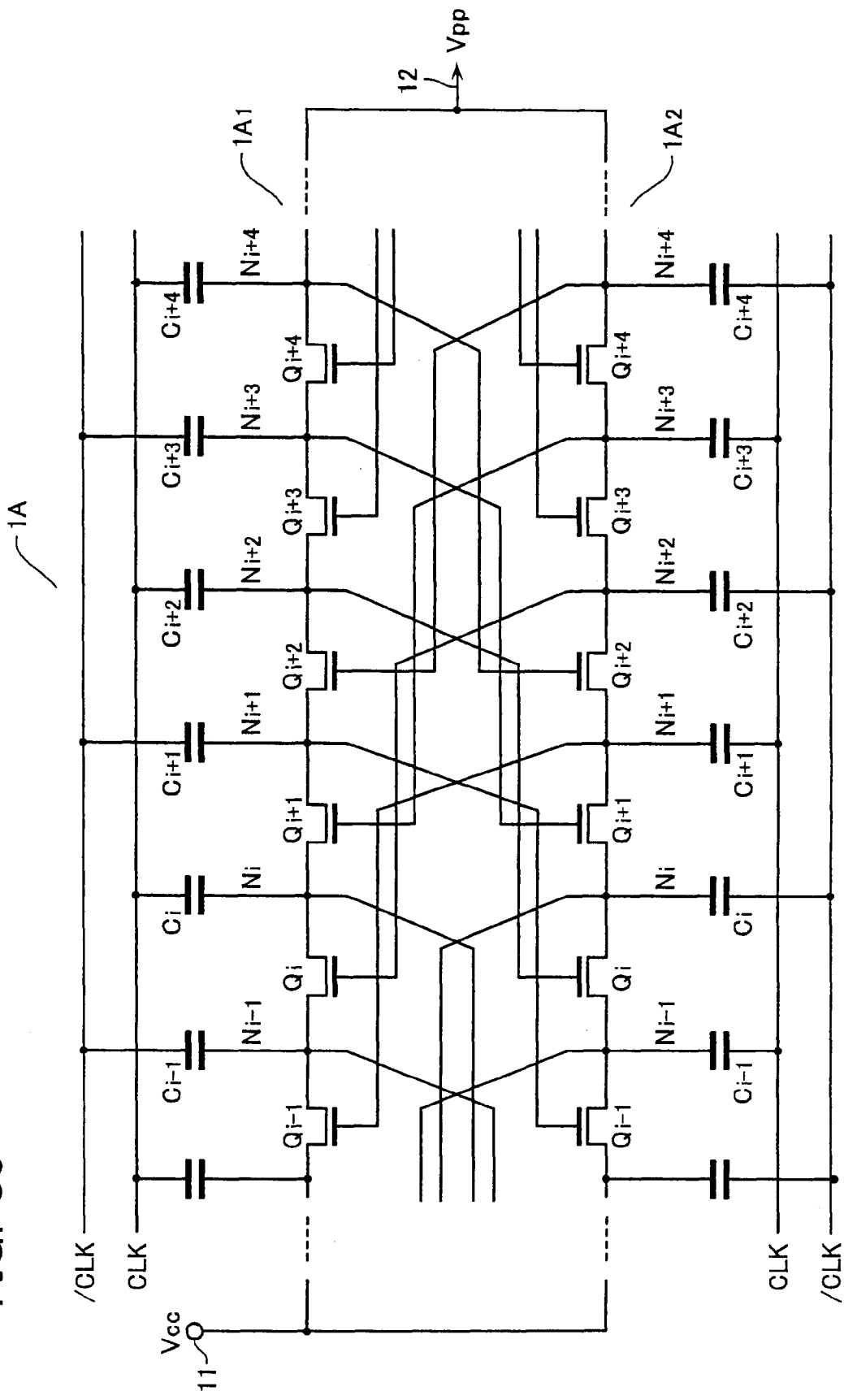
FIG. 30 shows a boost circuit in accordance with another embodiment.

In this embodiment, since gate of i-th transistor Qi in the first charge transfer circuit is coupled to drain of (i+1)-th transistor Qi+1 in the second charge transfer circuit, which is disposed nearer to Vpp node 12 side than transistor Qi and driven with the same phase as the transistor Qi in the first charge transfer circuit, it is obtained a high charge transferability. Further, variation of the boosted output voltage may be reduced because the corresponding stages in the two charge transfer circuits 1z1 and 1z2 are driven with reverse phases as similar in the embodiment shown in FIG. 27, Boost circuit 1A shown in FIG. 30 is a variant of that shown in FIG. 29. It is the same as in FIG. 29 that capacitors are prepared for two series charge transfer circuits 1A1 and 1A2, respectively. Gate of a transistor is coupled to drain of another transistor disposed far nearer to Vpp node 12 side than the embodiment shown in FIG. 29. For example, gate of i-th NMOS transistor Qi in the first charge transfer circuit 1A1 is coupled to drain of (i+3)-th NMOS transistor Qi+3 in the second charge transfer circuit 1A2 (i.e., connection node Ni+2 between NMOS transistors Qi+2 and Qi+3), which is driven with the same phase as transistor Qi in the first charge transfer circuit 1A1. As similar to this, gate of i-th NMOS transistor Qi in the second charge transfer circuit 1A2 is coupled to drain of (i+3)-th NMOS transistor Qi+3 in the first charge transfer circuit 1A1 (i.e., connection node Ni+2 between NMOS transistors Qi+2 and Qi+3), which is driven with the same phase as transistor Qi in the second charge transfer circuit 1A2. With respect to the remaining transfer stages, the same gate connections as described above are used. With this arrangement, it may be obtained high ability to boost.

Figure 31A:
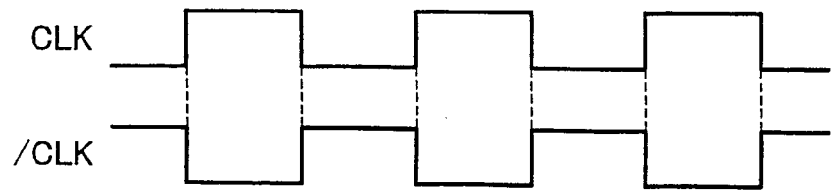
FIGS. 31A to 31E show some examples of waveforms of two-phase clocks used in the above-described embodiments.
Figure 31B:
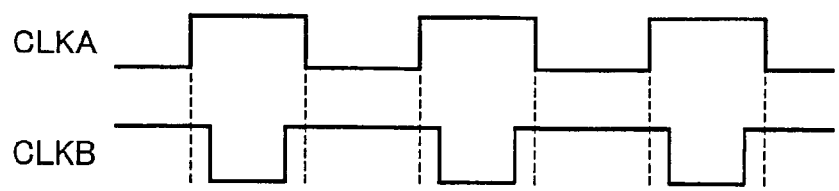
Figure 31C:
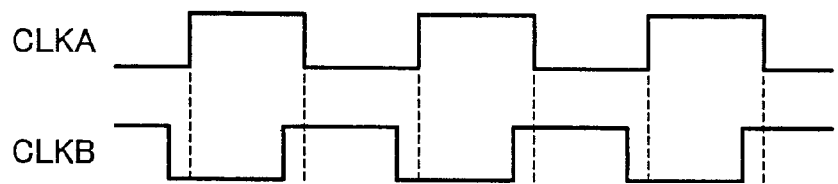
Figure 31D:
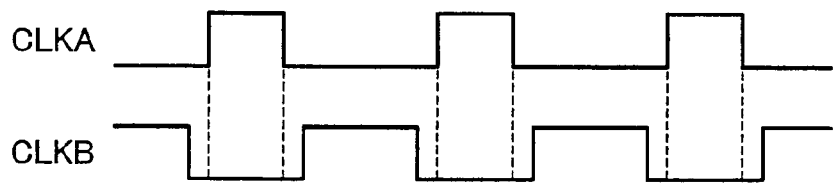
Figure 31E:
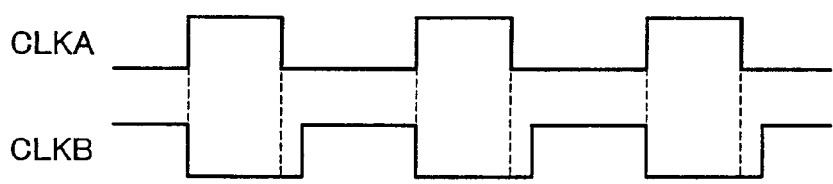

So far, two-phase clocks CLK and /CLK are used for driving capacitors. FIG. 31A shows an example, in which complementary clocks CKL and /CLK are completely reversed in phase, but this clock state is not always required. For example, as shown in FIGS. 31B to 31E, other types of two-phase clocks CLKA and CLKB with different phases from each other may be used.

Figure 32:
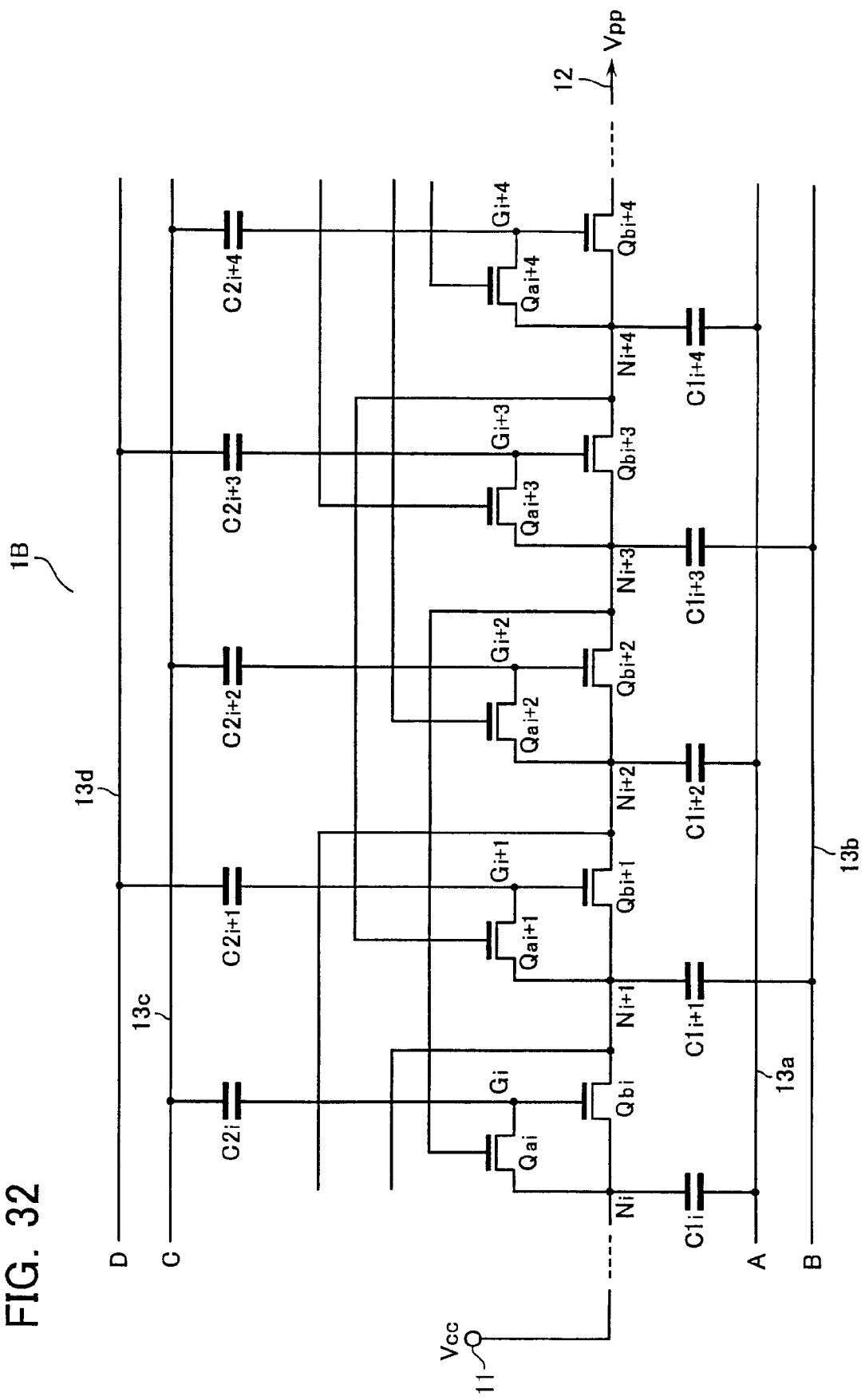
FIG. 32 shows a boost circuit in accordance with another embodiment.

This invention may be adapted to a boost circuit with a four-phase driving scheme. FIG. 32 shows a main portion of a boost circuit 1B with a four-phase driving scheme in accordance with another embodiment.

NMOS transistors Qb (Qbi, Qbi+1, Qbi+2, . . . ) are connected in series between Vcc node 11 and Vpp node 12, thereby constituting a charge transfer circuit. Drains (i.e., connection nodes) of these transferring transistors, N (Ni, Ni+1, Ni+2, . . . ) are alternately coupled to clock signal lines 13a and 13b, to which clocks A and B are supplied, respectively, via capacitors C1 (C1i, C1i+1, C1i+2, . . . ). Gates of these transistors are alternately coupled to clock signal lines 13c and 13d, to which clocks C and D are supplied, respectively, via capacitors C2 (C2i, C2i+1, C2i+2, . . . ).

Figure 37:
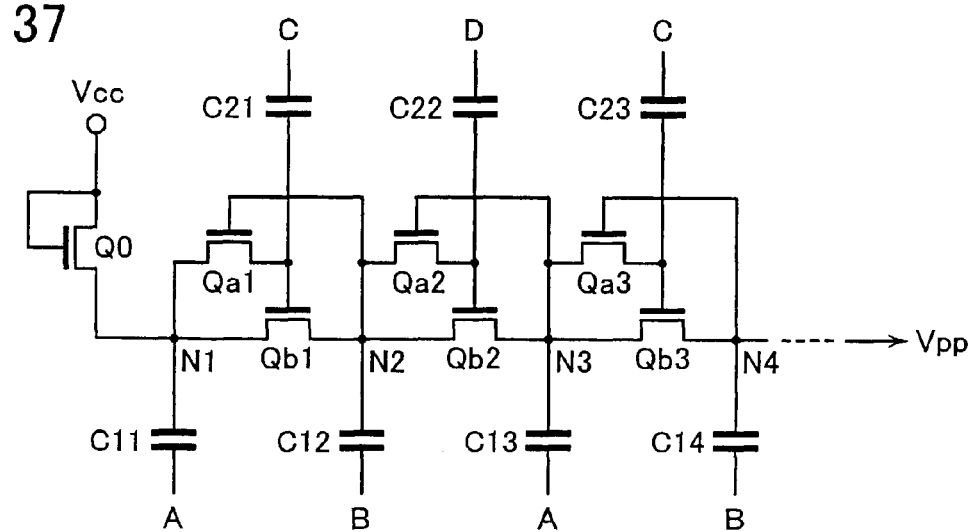
FIG. 37 shows a conventional boost circuit with a four-phase clock driving scheme.
Figure 38:
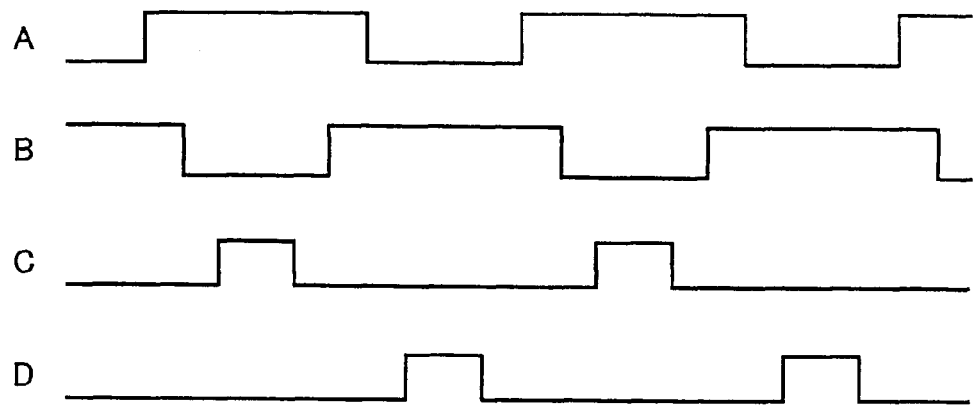
FIG. 38 shows waveforms of four-phase clocks used the circuit shown in FIG. 37.

To boost gates G (Gi, Gi+1, Gi+2, . . . ) of transistors Qb, NMOS transistors Qa (Qai, Qai+1, Qai+2, . . . ) are disposed between drains and gates of the transistors Qb, respectively. It is required of gate and drain of each transistor Qa to be driven with reverse phases by clocks A and B. Therefore, in the conventional case, as shown in FIG. 37, drains, sources and gates of gate boost-use transistors Qa are coupled to drains, gates and source of transistors Qbi, respectively. FIG. 38 shows conventional waveforms of four-phase clocks A, B, C and D.

By contrast, in this embodiment, gate of boost-use transistor Qa at a certain boost stage is coupled to source of transistor Qb disposed nearer to Vpp node 12 than the certain boost stage and driven with the same phase as the certain boost stage. For example, giving attention to transistor Qai, gate thereof is coupled to source of transfer transistor Qbi+2 (i.e., connection node Ni+3 between transistors Qbi+2 and Qbi+3). In other words, the gate of transistor Qai is driven by capacitor Ci+3 at another boost stage nearer to Vpp node 12. Gate of transistor Qai+1 is coupled to source of transfer transistor Qbi+3 (i.e., connection node Ni+4). The remaining gate boost-use transistors are coupled as similar to the above-described examples. Four-phase clocks shown in FIG. 38 are used in this embodiment as it is.

Figure 33:
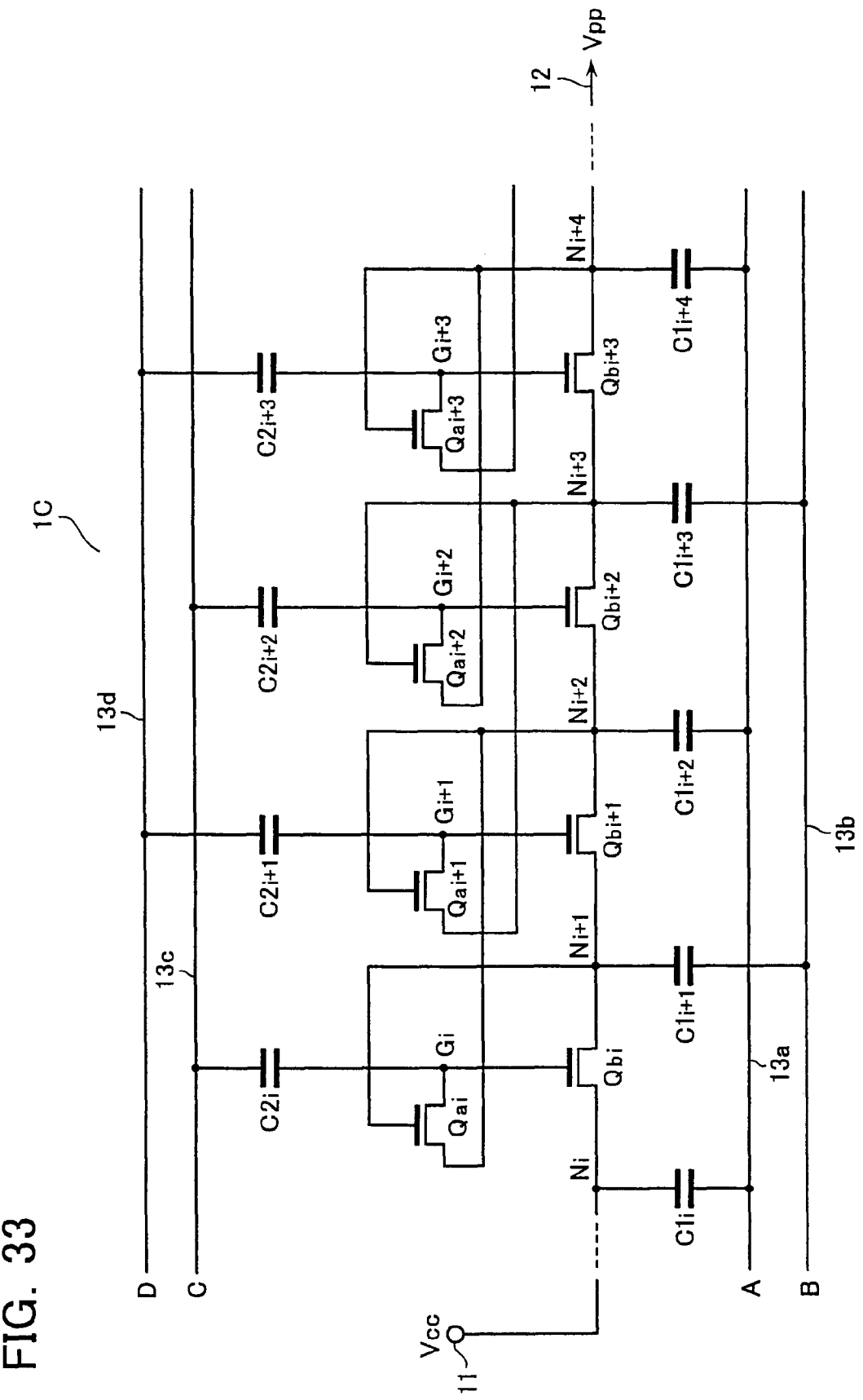
FIG. 33 shows a boost circuit in accordance with another embodiment.

Boost circuit 1C show in FIG. 33 is a variation of the boost circuit 1B shown in FIG. 32, in which coupling destinations of gates and drains of transistors Qa are different from those in FIG. 32. That is, gate and drain of transistor Qai are coupled to connection nodes Ni+1 and Ni+2, respectively. Gate and drain of transistor Qai+1 are coupled to connection nodes Ni+2 and Ni+3, respectively. The remaining gate boost-use transistors are coupled as similar to the above-described examples.

In other words, in this embodiment, gate of transistor Qa is coupled to source of transistor Qb at the corresponding stage like the conventional case shown in FIG. 37 while drain of transistor Qa at a certain stage is coupled to drain of another stage transistor Qb disposed nearer to Vpp node 12 than the certain stage and driven with the same phase as the certain stage.

Figure 34:
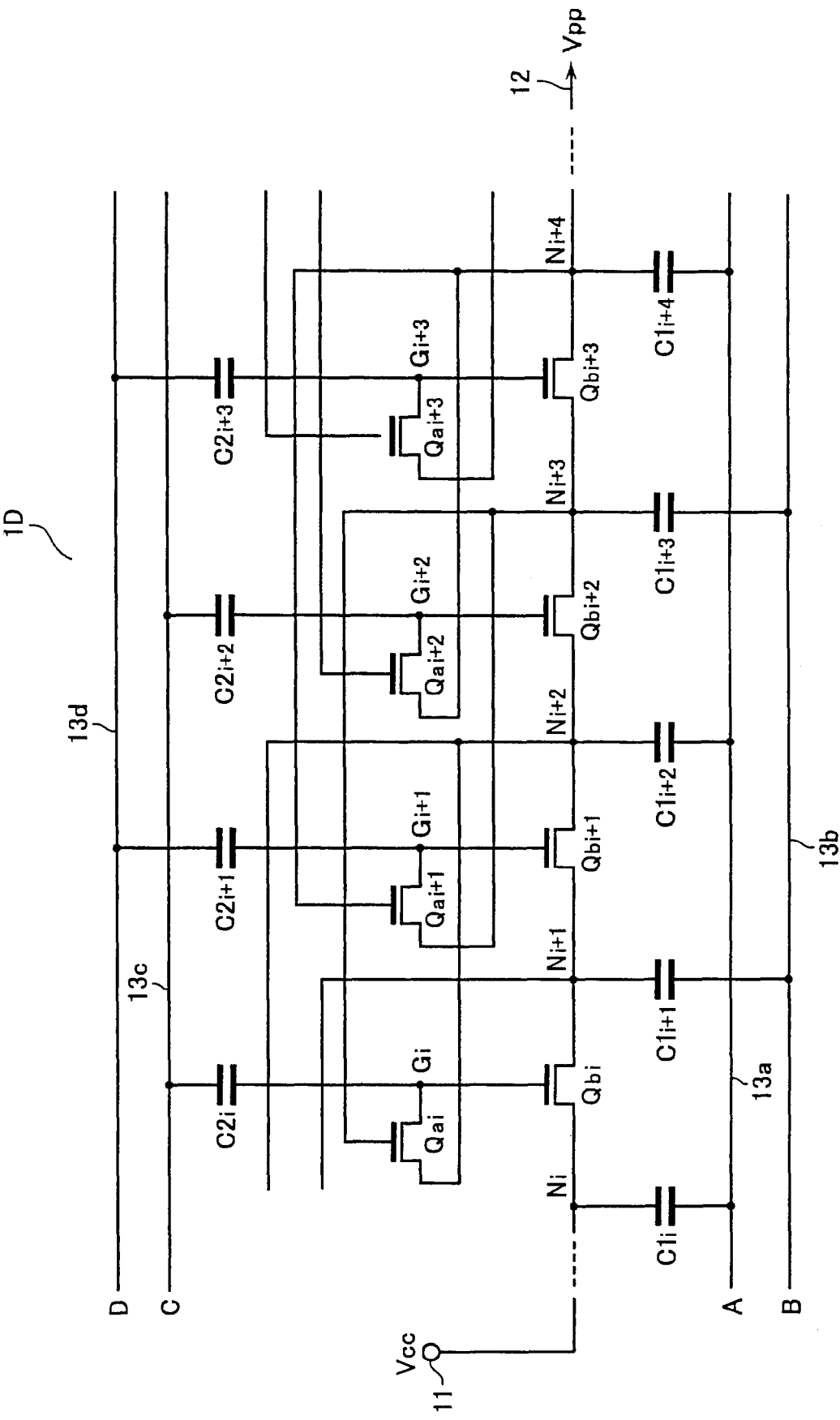
FIG. 34 shows a boost circuit in accordance with another embodiment.

Boost circuit 1D shown in FIG. 34 is a valiant formed by combination of FIGS. 33 and 34. With respect to the gate boost-use transistors Qa, gate connection is the same as in FIG. 32 while drain connection is the same as in FIG. 34. With these arrangements in the embodiments shown in FIGS. 33 and 34, it is possible to perform a boost operation with high ability.

The present invention is not limited to the above-described embodiments, but these embodiments may be variously varied as explained below.

For example, in the embodiment shown in FIG. 3, drivers are disposed between the capacitors and the clock signal lines. As similar to this, it is effective to dispose clock drivers in other embodiments.

It is effective to make the additional capacitor(s) (i.e., C9 in the embodiment shown in FIG. 4; C9-C11 in the embodiment shown in FIGS. 6; and C9-C12 in the embodiment shown in FIG. 7) smaller in capacitance than that of the preceding capacitors C1-C8. The reason is as follows: capacitors C1-C8 directly affects boost ability because capacitance thereof defines the charge quantity to be transferred while the additional capacitors C9-C12 are used only for increasing the drivability of the output stage transistor Q9 so that it is not required of those to be increased in capacity. As described above, form the capacitors C9-C12 to be smaller than the remaining capacitors, and it is preferable to make the boost circuit area small without reducing the boost ability.

In the embodiments shown in FIGS. 4-7, the charge transferability (i.e., drivability) of the additional transistors Q10-Q13 driven by the additional capacitors C9-C12 may be made less than that of the remaining transistors Q1-Q9 because these additional transistors have not direct influence on the boost operation. Therefore, make the gate width of these transistors Q10-Q13 smaller than that of other transistors, and it is possible to reduce the boost circuit area without reducing the boost ability.

It is also effective to make capacitors C9-C12 and transistors Q10-Q13 small in other embodiments with the same output stage configuration as those shown in FIGS. 4-7. Further, the transistor Q14 used in FIGS. 8-11 and FIGS. 15-20 may also be made less or smaller in charge transferability or size than transistors Q1-Q9 because the transistor Q14 has not direct influence on the boost operation. Therefore, make the gate width of the transistor Q14 smaller than that of other transistors, and it is possible to reduce the boost circuit area without reducing the boost ability.

In the above-described embodiments, it is effective to set the threshold voltage (where, it is in a state of no back-bias) of the initial stage transistor Q1 to be higher than the following stage transistors Q2-Q9. The reason is as follows. While the boost circuit is active, as the boost stage is latter, back-bias effect in the transfer transistors becomes greater, i.e., threshold voltage becomes higher. In other words, the initial stage transistor Q1 has such the least back-bias effect in the boost circuit that leak current (i.e., flow in reverse) toward the Vcc node 11 is easily generated. Therefore, set the threshold voltage of this transistor Q1 to be higher than others, and it becomes possible to suppress the above-described leak current.

Figure 35:
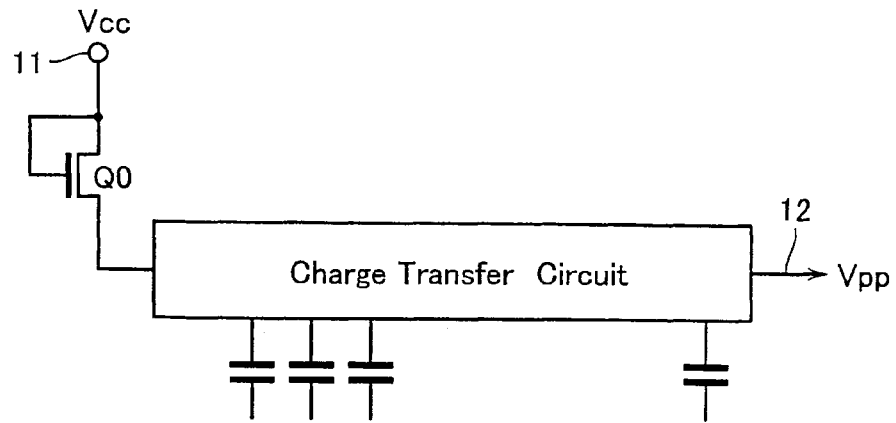
FIG. 35 shows a load configuration adaptable to the above-described embodiments.
Figure 36:
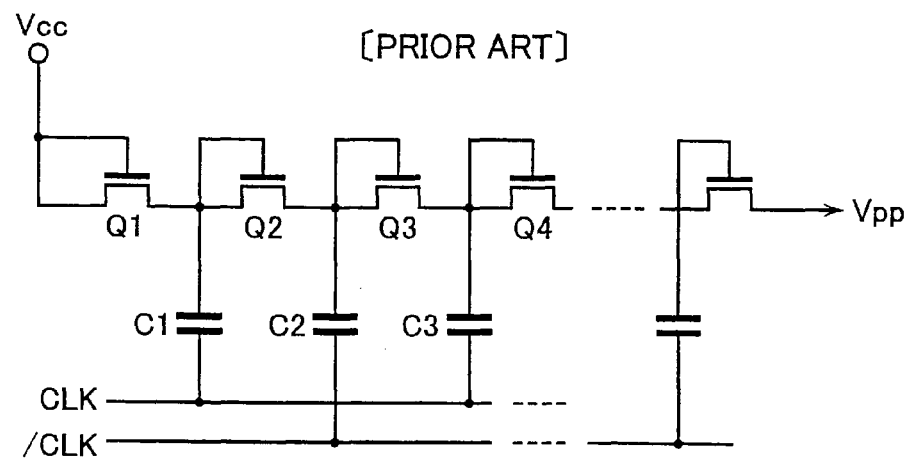
FIG. 36 shows a conventional boost circuit with a two-phase clock driving scheme.

It is also effective for preventing leakage that as shown in FIG. 35, a diode-connected transistor Q0 is disposed between the charge transfer circuit and Vcc node 11. In case gate and drain of the initial stage transistor Q1 in the charge transfer circuit are boosted independently of each other, there is a fear of leak. Add the transistor Q0, in which gate and drain are connected to each other, as serving as a current source load as shown in FIG. 35, and leakage may be effectively suppressed here even if the threshold voltage is not set to be specifically high. In other words, without adding processes for forming transistors with different threshold voltages, leakage may be suppressed. It is further effective for preventing leakage that the threshold voltage of transistor Q0 is set higher than that of the transferring transistors.

Considering that as it is nearer to the output stage from the input stage in the charge transfer circuit, source/drain voltage becomes higher, it is effective to form the gate insulating film or capacitor insulating film near the input stage to be thinner than that near the output stage. The thinner the transistor's gate insulating film is formed, the higher drivability of the transistor becomes. Therefore, supposing that transistor drivability of the whole charge transfer circuit is kept constant, transistor size at the input stage side may be lessened in comparison with that at the output stage side. Similarly, supposing that the capacitance of the entire capacitors in the charge transfer circuit is made even, capacitor size at the input stage side may be lessened in comparison with that at the output stage side.

Further, the thickness of the gate insulating film and capacitor insulating film may be switched among three or more levels. In the case that the load NMOS transistor Q0 is added as shown in FIG. 35, it is effective for reducing the boost circuit area that gate insulating film thereof is made thinner than that in other transistors.

In this invention, it is possible to use PMOS transistors for constituting a boost circuit. For example, in case a boost circuit is formed of PMOS transistors in such a manner that the voltage input node serves as a Vss node applied with ground potential, negative voltage will be generated.

The boost circuits in the above-described embodiments may be adapted to various semiconductor integrated circuit devices. Particularly, it is effective to adapt the boost circuits to semiconductor memory devices, which is required to generate various internal voltages higher than the power supply voltage at data write, read and erase times. As such an embodiment, an EEPROM flash memory will be explained below.

Figure 39:
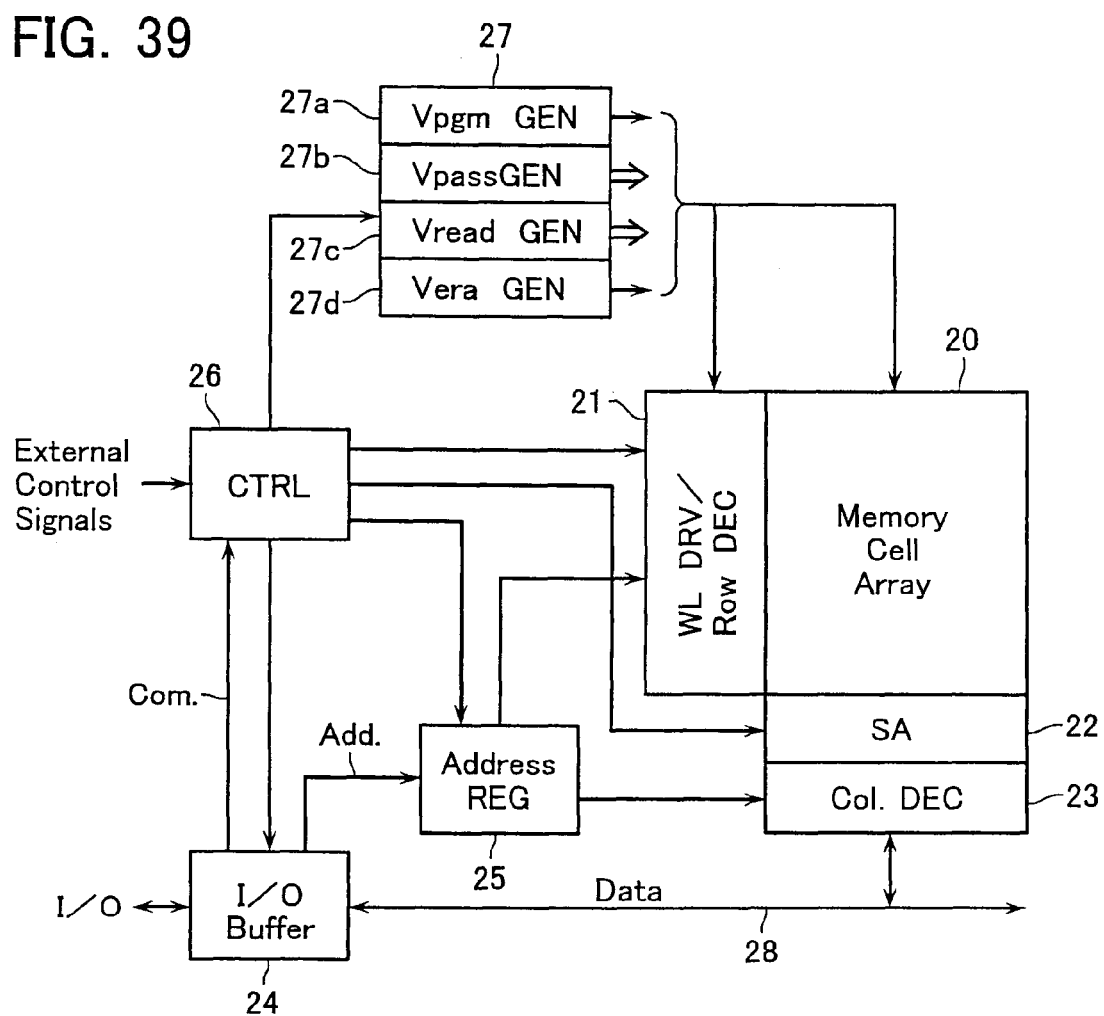
FIG. 39 shows a functional block configuration of a NAND-type flash memory, to which the boost circuits in the above-described embodiments are adapted.
Figure 40:
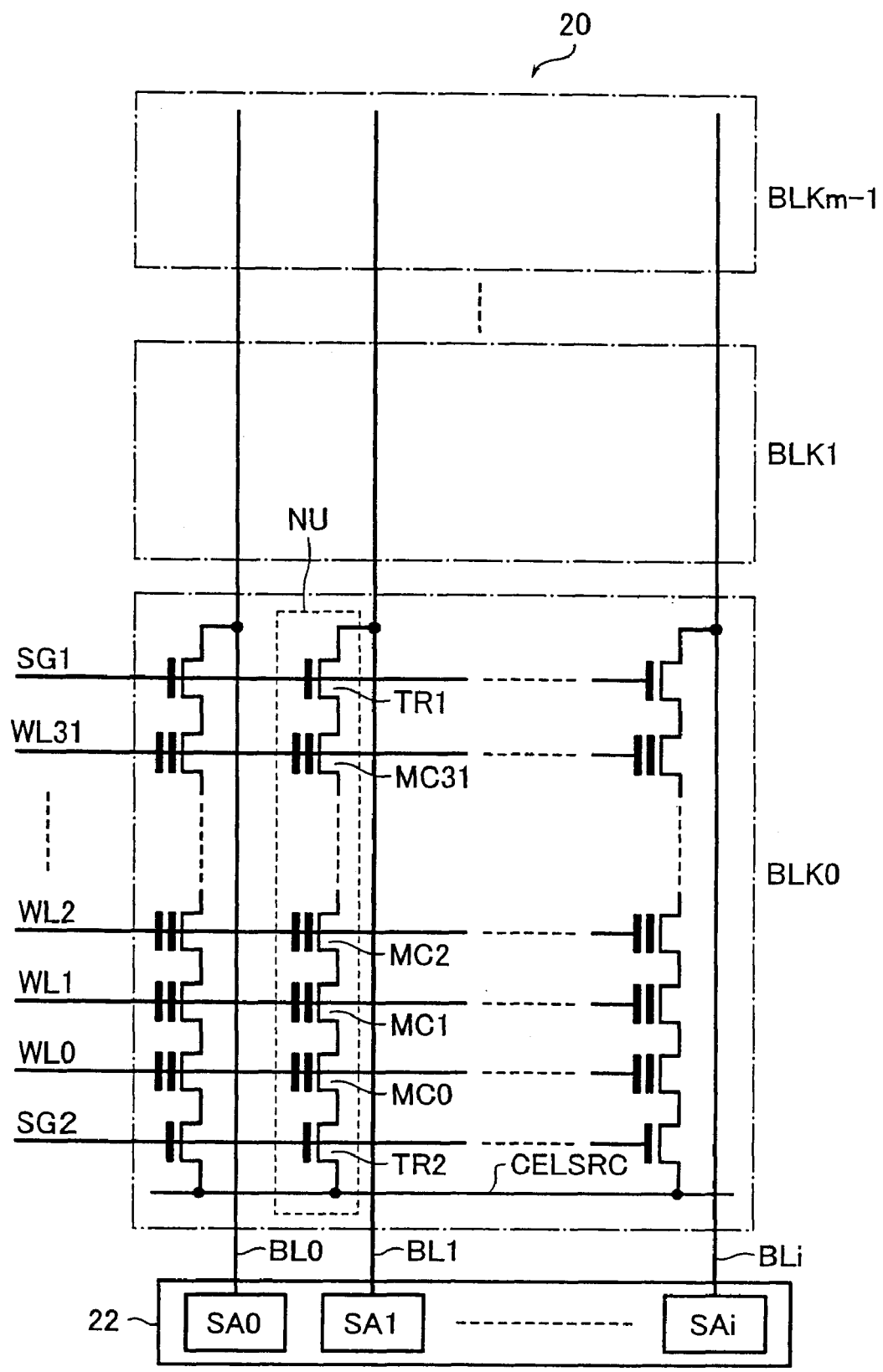
FIG. 40 shows a memory cell array in the flash memory.

FIG. 39 shows a functional block configuration of a NAND-type flash memory, and FIG. 40 shows an equivalent circuit of the memory cell array 20. Memory cell array 20 is formed of electrically rewritable and non-volatile memory cells arranged therein. Explaining in detail, the memory cell array 20 is formed of NAND cell units NU arranged therein, in each of which plural (thirty two in this example) memory cells MC0-MC31 are connected in series. One end of the NAND cell unit NU is coupled to a bit line BL via a select gate transistor TR1; and the other end to a common source line CELSRC via another select gate transistor TR2.

Control gates in the NAND cell unit NU are coupled to different word lines WL0-WL31, respectively. Gates of the select gate transistors TR1 and TR2 are coupled to select gate lines SG1 and SG2, respectively. A set of NAND cell units sharing a word line is defined as a block, which serves as a unit of data erase. As shown in FIG. 40, plural blocks (BLK0-BLKm-1) are arranged in the direction of the bit line BL.

A word line driver 21, which includes a row decoder, is for detecting and driving the word lines and select gate lines. A sense amplifier circuit 22 serving as a data latch is coupled to bit lines and serves for reading/writing data. Data transmission between the sense amplifier circuit 22 and the external input/output terminals I/O is performed via I/O buffer 24. Data transfer between the sense amplifier circuit 22 and a data bus 28 is controlled by a column decoder 23 with column gate circuits.

Address "Add." supplied via the input/output terminals I/O is transferred to the word line driver 21 and column decoder 23 via an address register 25. Command "Com." supplied via the input/output terminals I/O is transferred to and decoded in a controller 26.

Controller 26 controls distinguishing between data "Data" and address "Add." and transferring them in response to command "Com.", and executes operation controls of data write, read and erase based on external control signals. Additionally, controller 26 controls an internal voltage generating circuit 27 to generate various internal voltages required in accordance with operation modes.

Explaining in detail, the internal voltage generating circuit 27 has: Vpgm generating circuit 27a for generating write voltage Vpgm to be applied to a selected word line at a data write time; Vpass generating circuit 27b for generating pass voltage Vpass to be applied to non-selected word lines at a data write time; Vread generating circuit 27c for generating pass voltage Vread to be applied to non-selected word lines at a data write time; Vera generating circuit 27d for generating erase voltage Vera to be applied to a p-type well, on which the cell array 20 is formed, at an erase time; and the like. Every one of the boost circuits described above may be adapted to this internal voltage generating circuit 27.

Operations of this NAND-type flash memory will be explained in brief below. Suppose here that a memory cell stores binary data in such a way as: a positive threshold state defined as a logic "0" data; and a negative threshold voltage state as a logic "1" data.

Data write is performed by a page with selecting the page in a block. Note here that a set of memory cells sharing a word line is defined as a page. At a write time, write voltage Vpgm is applied to a selected word line; and pass voltage Vpass to non-selected word lines, which is necessary to turn on cells without regard to cell data. Prior to the write voltage application, selected channels of selected NAND cell units are charged to certain voltages in accordance with write data supplied via the bit lines.

That is, in case of "0" write, 0V is applied to a bit line, and it is transferred to a selected cell's channel. In case of "1" write, Vcc is applied to a bit line so that a selected cell's channel is charged up to Vcc-Vth (Vth: threshold voltage of the select gate transistor) to be in a floating state. When the write voltage Vpgm is applied to the selected word line in the above-described state, data will be written as follows: in a "0" write cell, electrons are injected into the floating gate due to FN tunneling current, whereby "0" data (i.e., positive threshold state) is written; in a "1" write cell (write-inhibiting cell), electron injection is not generated, and "1" data state (i.e., negative threshold state) is kept as it is.

Data read is performed as follows. After having precharged bit lines to a certain voltage, read voltage, for example 0V, is applied to a selected word line; and pass voltage Vread, which is set to turn on cells without regard to cells' data, is applied to non-selected word lines. With this voltage application, the precharged bit lines are discharged (in case of "1" data) or not discharged (in case of "0" data) in accordance with cell data. Therefore, detect the bit line voltage change, and data may be sensed. Such the data read is performed by a page.

Data erase is usually performed by a block as follows. 0V is applied to the entire word lines in a selected block; and erase voltage Vera to the p-type well of the cell array. Word lines in non-selected blocks are held in a floating state. With this voltage application, the entire memory cells in the selected block experience electron-release from the floating gate to the channel, thereby being "1" data state (i.e., negative threshold state or erase state).

This invention is not limited to the above-described embodiments. It will be understood by those skilled in the art that various changes in form and detail may be made without departing from the spirit, scope, and teaching of the invention.

What is claimed is:

1. A boost circuit comprising:
   a first charge transfer circuit with first transistors connected in series between a voltage input node and a voltage output node;
   a second charge transfer circuit with second transistors connected in series between the voltage input node and the voltage output node;
   first capacitors, one ends of which are connected to first connection nodes between the first transistors and are connected to gates of the second transistors, respectively, the other ends thereof being applied with clocks with plural phases; and
   second capacitors, one ends of which are connected to second connection nodes between the second transistors and are connected to gates of the first transistors, respectively, the other ends thereof being applied with the clocks with plural phases, wherein
   the first charge transfer circuit and the second charge transfer circuit are connected in parallel between the voltage input node and the voltage output node, and
   the corresponding first and second connection nodes in the first and second charge transfer circuits are driven with substantially reverse phases via the first and second capacitors, respectively, while the corresponding gates of the first and second transistors are driven with substantially reverse phases via the second and first capacitors, respectively.

2. The boost circuit according to claim 1, wherein
   a gate of i-th transistor (where, "i" is a stage number counted from the voltage input node) in the first charge transfer circuit is connected to drain of (i+1)-th transistor in the second charge transfer circuit while a gate of i-th transistor in the second charge transfer circuit is connected to drain of (i+1)-th transistor in the first charge transfer circuit.

3. The boost circuit according to claim 1, wherein
   a gate of i-th transistor (where, "i" is a stage number counted from the voltage input node) in the first charge transfer circuit is connected to drain of (i+3)-th transistor in the second charge transfer circuit while a gate of i-th transistor in the second charge transfer circuit is connected to a drain of (i+3)-th transistor in the first charge transfer circuit.

4. A boost circuit comprising:
   first transistors connected in series between a voltage input node and a voltage output node to constitute a charge transfer circuit;
   first capacitors, one ends of which are connected to connection nodes between the first transistors, respectively, the other ends thereof being alternately applied with first and second clocks;
   second transistors each source of which is coupled to a gate of each the first transistors, drains and gates of the second transistors being driven by the first and second clocks, respectively; and
   second capacitors, one ends of which are connected to the respective gates of the first transistors, the other ends thereof being alternately applied with third and fourth clocks, wherein
   at least one of a drain and a gate of the second transistor at a certain stage is connected to the first capacitor positioned at another stage, which is disposed nearer to the voltage output node than both the certain stage and the following stage, and the first capacitor positioned at another stage is driven with the same phase as the first capacitor positioned at the certain stage.

5. A semiconductor integrated circuit device in which a boost circuit is integrally formed, the boost circuit comprising:
   first transistors connected in series between a voltage input node and a voltage output node to constitute a charge transfer circuit; and
   first capacitors, one ends of which are connected to the respective connection nodes between the first transistors, the other ends thereof being applied with clocks with plural phases, the other ends thereof not being connected to the connection nodes between the first transistors, wherein
   a gate of a certain stage transistor corresponding to one of the first transistors in the charge transfer circuit is connected to a drain of another stage transistor corresponding to another one of the first transistors, the gate of the certain stage transistor is not connected to any of a source and a drain of the certain stage transistor, and the drain of the another stage transistor which is disposed nearer to the voltage output node than the certain stage transistor and the drain of the certain stage transistor are driven by the same phase clock of the gate as that of the certain stage transistor.

6. The semiconductor integrated circuit device according to claim 5, wherein the device is a flash memory.

* * * * *